(12) United States Patent
Norton

(10) Patent No.: US 8,504,404 B2
(45) Date of Patent: Aug. 6, 2013

(54) DISTANCE AND LOCATION-AWARE SCHEDULING ASSISTANCE IN A CALENDAR SYSTEM WITH NOTIFICATION OF POTENTIAL CONFLICTS

(75) Inventor: Kenneth S. Norton, San Carlos, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/162,505

(22) Filed: Jun. 16, 2011

(65) Prior Publication Data

US 2012/0150580 A1    Jun. 14, 2012

Related U.S. Application Data

(60) Provisional application No. 61/356,000, filed on Jun. 17, 2010.

(51) Int. Cl.
*G06F 17/00* (2006.01)
(52) U.S. Cl.
USPC ........................................... 705/7.19
(58) Field of Classification Search
USPC ...................................... 705/7.19
See application file for complete search history.

(56) References Cited

U.S. PATENT DOCUMENTS

| | | | |
|---|---|---|---|
| 6,732,080 B1 | 5/2004 | Blants | |
| 2006/0077055 A1 | 4/2006 | Basir | |
| 2008/0079566 A1 | 4/2008 | Singh et al. | |
| 2009/0036148 A1* | 2/2009 | Yach | 455/457 |
| 2011/0090078 A1* | 4/2011 | Kim et al. | 340/522 |

OTHER PUBLICATIONS

International Search Report and Written Opinion, PCT/US11/40922, Dec. 13, 2011, 13 pgs.

* cited by examiner

*Primary Examiner* — Thomas Dixon
(74) *Attorney, Agent, or Firm* — Morgan, Lewis & Bockius LLP

(57) ABSTRACT

A method and a system for providing scheduling assistance are described. A computer-implemented method includes extracting from a request for scheduling a meeting a meeting location and a meeting start time in response to the request from a requester. The method includes retrieving, from an event database, event information for a preceding event occurring before the meeting. The event information includes an event location and an event end time. Travel time from the event location to the meeting location is determined, and a potential travel time scheduling conflict is identified when the travel time exceeds a time difference between the event end time and the meeting start time. Notification of the potential travel time scheduling conflict is provided to the requester.

22 Claims, 14 Drawing Sheets

DISTANCE AND LOCATION-AWARE SCHEDULING ASSISTANCE IN A CALENDAR SYSTEM WITH NOTIFICATION OF POTENTIAL CONFLICTS

RELATED APPLICATIONS

This claims priority to U.S. Provisional Application Ser. No. 61/356,000, filed Jun. 17, 2010, entitled "Distance and Location-Aware Reminders and Scheduling Assistance in a Calendar System," which is incorporated by reference herein in its entirety.

This application is related to U.S. patent application Ser. No. 13/162,502, filed Jun. 16, 2011, entitled "Distance and Location-Aware Reminders in a Calendar System," which is incorporated by reference herein in its entirety.

TECHNICAL FIELD

The disclosed embodiments relate generally to reminders in a calendar system. More particularly, the disclosed embodiments relate to methods and systems for distance and location-aware reminders and scheduling assistance in an electronic calendar system.

BACKGROUND

Electronic calendars are increasingly used to organize our lives. Such calendars are accessed from both desktop computers and portable computing devices (e.g., laptop computers, personal digital assistants (PDAs), mobile phones, and wearable computers).

One problem with calendars is providing a timely reminder so that a respective user can prepare for an upcoming event. Providing a reminder at a fixed interval before the upcoming event is not always timely, because the fixed interval may not be effective for all situations. For example, a user may be at a location further away than usual from the location of the upcoming event, and the user would need a reminder earlier than usual to travel to the event location. On the other hand, if the user receives a reminder too soon, the user may ignore the reminder, and later miss or come late to the upcoming event. Therefore, there is a need for a new method and system for providing a timely reminder based on the location of the user and the distance to the event location.

Another problem with calendars is providing scheduling assistance that accounts for the known or predicted location of a requester or an invitee prior to a particular meeting and a distance to a meeting location. Scheduling a meeting without consideration for the travel time between meetings can result in the requester coming late to the meeting or sometimes abandoning the attendance. Therefore, there is a need for a new method and system for providing scheduling assistance that accounts for the location of the requester or the invitee and the distance to the meeting location.

SUMMARY

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for responding to a predefined triggering event by retrieving event information for a respective event from an event database and obtaining an origin of the respective user. A travel time is determined from the origin to the event location. In accordance with the event start time and travel time, an event reminder time is determined, including a time at which the respective user is to be provided a reminder of the respective event.

As described in more detail below, some embodiments of the invention involve a computer-implemented method of determining a time to provide an event reminder for a respective event for a respective user including, in response to a predefined triggering event, retrieving event information for the respective event, including an event location and an event start time, from an event database. An origin of the respective user is obtained. A travel time is determined for the respective user to travel from the origin to the event location. In accordance with the event start time and travel time, an event reminder time is determined for the respective event, where the event reminder time includes a time at which the respective user is to be provided a reminder of the respective event.

A server system for determining a time to provide an event reminder for a respective event for a respective user comprises one or more processors for executing programs and memory storing one or more programs be executed by the one or more processors, the one or more programs comprising instructions executed by the one or more processors so as to perform the aforementioned method for determining a time to provide an event reminder for a respective event for a respective user.

A server system for determining a time to provide an event reminder for a respective event for a respective user comprises one or more processors, memory, and one or more programs stored in the memory, the one or more programs comprising instructions executed by the one or more processors so as to respond to a predefined triggering event by: retrieving, from an event database, event information for the respective event, including an event location and an event start time; and obtaining an origin of the respective user. The one or more programs include instructions to determine a travel time for the respective user to travel from the origin to the event location; and to determine, in accordance with the event start time and travel time, an event reminder time for the respective event, where the event reminder time includes a time at which the respective user is to be provided a reminder of the respective event.

A non-transitory computer readable storage medium stores one or more programs configured for execution by a computer, the one or more programs comprising instructions for performing the aforementioned method for determining a time to provide an event reminder for a respective event for a respective user.

A non-transitory computer readable storage medium stores one or more programs configured for execution by one or more processors of a computer for determining a time to provide an event reminder for a respective event for a respective user, and the one or more programs comprises instructions to be executed by the one or more processors so as to respond to a predefined triggering event by: retrieving, from an event database, event information for the respective event, including an event location and an event start time; and obtaining an origin of the respective user. The one or more programs include instructions to determine a travel time for the respective user to travel from the origin to the event location; and to determine, in accordance with the event start time and travel time, an event reminder time for the respective event, the event reminder time comprising a time at which the respective user is to be provided a reminder of the respective event.

Some embodiments involve a computer-implemented method of providing scheduling assistance, performed on a system having one or more processors and memory storing one or more programs for execution by the one or more processors. The method includes, in response to a request from a requester for scheduling a meeting, extracting from the request a meeting location and a meeting start time. The method also includes retrieving, from an event database, event information for a preceding event occurring before the meeting, including an event location and an event end time. The method includes determining travel time from the event location to the meeting location, and identifying a potential travel time scheduling conflict when the travel time exceeds a time difference between the event end time and the meeting start time. The method includes providing notification of the potential travel time scheduling conflict to the requester.

A server system for providing scheduling assistance comprises one or more processors for executing programs and memory storing one or more programs be executed by the one or more processors, the one or more programs comprising instructions executed by the one or more processors so as to perform the aforementioned method for providing scheduling assistance.

A non-transitory computer readable storage medium stores one or more programs configured for execution by a computer, the one or more programs comprising instructions for performing the aforementioned method for providing scheduling assistance.

Some embodiments involve a computer-implemented method of providing scheduling assistance, performed on a system having one or more processors and memory storing one or more programs for execution by the one or more processors. The method includes, in response to a meeting invitation to an invitee from a requester, extracting from the meeting invitation a meeting location and a meeting start time. The method also includes retrieving, from an event database, event information for a preceding event occurring before the meeting, including an event location and an event end time, the preceding event comprising a calendar event in a calendar associated with the invitee. The method includes determining travel time from the event location to the meeting location, and identifying a potential travel time scheduling conflict when the travel time exceeds a time difference between the event end time and the meeting start time. The method includes providing notification of the potential travel time scheduling conflict to the invitee.

A server system for providing scheduling assistance comprises one or more processors for executing programs and memory storing one or more programs be executed by the one or more processors, the one or more programs comprising instructions executed by the one or more processors so as to perform the aforementioned method for providing scheduling assistance.

A non-transitory computer readable storage medium stores one or more programs configured for execution by a computer, the one or more programs comprising instructions for performing the aforementioned method for providing scheduling assistance.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Figure 1:
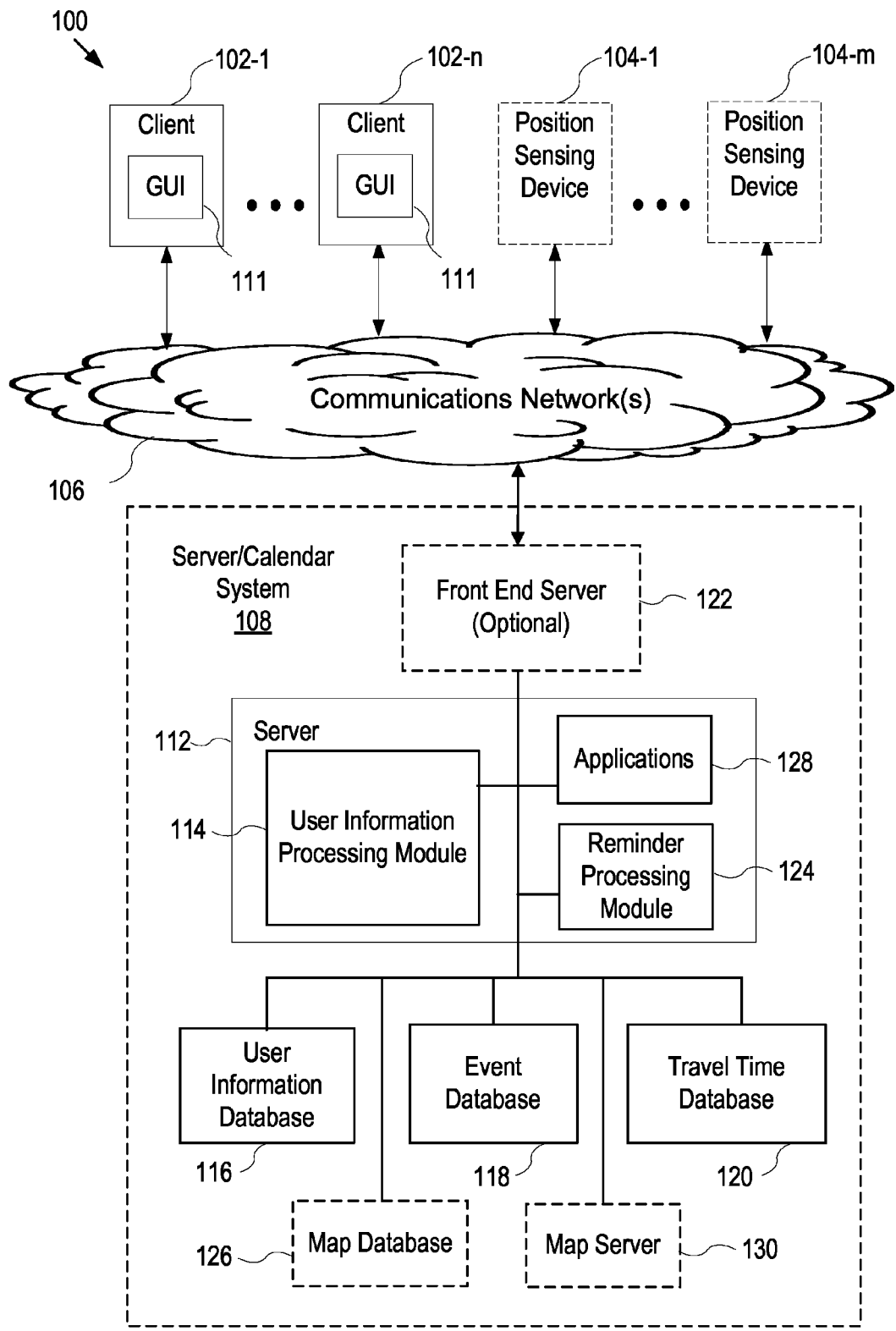
FIG. 1 is a block diagram illustrating an exemplary distributed computer system in accordance with some embodiments.

Methods and systems for determining a time to provide an event reminder are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term, "requester" is used to mean a person scheduling, initiating, or organizing a meeting.

As used herein, the terms, "meeting" and "event" are used interchangeably to mean a calendar event involving one or more participants. As used herein, "meetings" can include both single-participant meetings (e.g., a person reserving a conference room to work alone on a confidential matter), and multiple-participant meetings. As used herein, the terms "meeting location" and "event location" refer to the physical location of a meeting or event, respectively, such as a conference room, other room, physical address, city, campus, campus sub-region, building, floor, and/or building sub-region.

As used herein, the terms "invitee" and "potential participant" have been used interchangeably to mean people invited to an event, irrespective of whether they have accepted, declined, or not yet responded to the invitation. Furthermore, as used herein, the "invitees" of a meeting include the requester of the meeting.

As used herein, the term "required attendee" is used to mean invitees whose attendance a requester has identified as required, irrespective of whether they have accepted, declined, or not yet responded to the invitation. As used herein, the term, "optional attendee" has been used to mean invitees whose attendance a requester has identified as optional, irrespective of whether they have accepted, declined, or not yet responded to the invitation.

FIG. 1 is a block diagram illustrating an exemplary distributed computer system 100, according to certain embodiments. In FIG. 1, system 100 includes one or more client computers 102, a communications network 106, and a calendar system 108 (sometimes called server system 108). Various embodiments of calendar system 108 implement the reminder time determination methods described in this document.

Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s). Client 102 includes a graphical user interface (GUI) 111. Client 102 is described in greater detail below with reference to FIG. 3. Client 102 is connected to calendar system 108 via communications network 106. As described in more detail below, the GUI 111 is used to display calendar event information, including an event reminder.

Calendar system 108 provides a calendar service, including determining the timing of event or meeting reminders, to a community of users (e.g., the employees of a company, the members of an organization or group, the users of a facility, and the users of a web-based calendar system, such as Google Calendar) who access the calendar system from the clients 102. Calendar system 108 also provides typical calendar service, such as sending and receiving meeting invitations, accepting and/or declining meeting invitations, sending notification of acceptance/declination, storing meeting/event information, and presenting meeting/event information.

Calendar system 108 includes one or more servers, such as server 112, connected to the communications network 106. Optionally, the one or more servers are connected to the communications network 106 via a front end server 122 (e.g., a server that conveys (and optionally parses) inbound requests to the appropriate server of calendar system 108, and that formats responses and/or other information being sent to clients in response to requests). Front end server 122, if present, may be a web server providing web based access to calendar system 108. Front end server 122, if present, may also route communications to and from other destinations, such as a calendaring system.

Calendar system 108 includes a user information database 116, an event database 118, and optionally a travel time database 120. In some embodiments, calendar system 108 also includes or has access to one or more other databases, such as one or more map databases 126. Server 112 includes a reminder processing module 124 and applications 128. In some embodiments, server 112 also includes user information processing module 114. Server 112 communicates with databases internal to calendar system 108, such as user information database 116, event database 118, and travel time database 120, and in some embodiments, map database 126 using a local area network, by internal communication busses, or by any other appropriate mechanism or combination of mechanism.

Server 112 communicates with clients 102 via the front end server 122 (if present) and communication network(s) 106. In the cases where the calendar system includes multiple servers, each server, such as server 112, is optionally coupled to a communication network 106 via a front end server 122. In some embodiments, the communications network 106 is the Internet. In other embodiments, the communication network 106 can be any local area network (LAN), wide area network (WAN), metropolitan area network, or a combination of such networks. In some embodiments, server 112 is a web server that manages electronic calendars using appropriate communication protocols. Alternatively, if server 112 is used within an intranet, it may be an intranet server.

Applications 128 include application programs used for managing an online calendar system. In some embodiments, applications 128 also include a user information processing module (e.g., user information processing module 114), where the user information processing module assists in accessing and updating user information database 116. User information database 116 stores various information associated with the users of calendar system 108, including user preferences, default locations, and a default reminder time interval. Event database 118 store information (e.g., metadata) concerning various types of calendars as well as data (e.g., event data, also called event entry data, calendar data, calendar entry data, or calendar event data) from various calendars.

Reminder processing module 124 determines a time to provide an event reminder for a respective event for a respective user. Reminder processing module 124 retrieves stored event information. In some embodiments, reminder processing module transmits the determined time to client 102, and client 102 provides an event reminder at the event reminder time for the respective user.

In some embodiments, reminder processing module 124 assists in accessing and updating event database 118. In some other embodiments, reminder processing module 124 also assists in accessing and updating travel time database 120.

Travel time database 120, if included in system 108, includes travel times between pairs of locations among a plurality of locations. In some embodiments, travel time database 120 includes travel times for respective time segments (e.g., morning/evening commute time, carpool lane time, etc.), for respective time of the week (e.g., weekday v. weekend), for respective time of the year (e.g., national holiday, shopping season, etc.), for a respective direction (e.g., heading north v. heading south), for a respective mode of travel (e.g., walking; riding on a walkway, if available; driving; taking a public transportation; taking an elevator; and taking the stairs).

In some embodiments, map database 126 stores location information (e.g., such as city, campus, campus sub-region, building, floor, and/or building sub-region) concerning various locations, including event locations. In some other embodiments, map database 126 also stores information about pathways and/or travel distance between event locations.

In some embodiments, calendar system 108 includes or has access to a map server 130. Map server 130 is a server (e.g., a server for the Google Maps service) that provides travel directions, travel distance, and/or travel time, between specified pairs of locations. Optionally, embodiments that include or have access to map server 130 use map server 130 instead of travel time database 120 to obtain travel times between specified locations. When two locations are in the same building or campus, such that map server 130 is unable to provide an estimated travel time between the two locations, a default travel time may be used. Alternatively, travel time database 120 may be used in conjunction with map server 130 to provide travel times.

In some embodiments, the user information database 116 includes user information records having information relevant to determining travel times. For example, the user information record for a respective user may include, in addition to identifying information for the user, a default location (e.g., the location of the user's office), a default reminder time interval selected by the user, and user preferences (e.g., mobility limitations, transportation preference, data display preference, etc.).

In essence, server 112 is configured to manage certain aspects of calendar system 108, including transmitting event data (including event reminder time) to a respective client 102 for rendering at least a portion of the data on an electronic calendar in calendar system 108 based on the respective user's preferences.

In some embodiments, client 102 provides an event reminder for a respective user by displaying the event reminder on GUI 111. In some other embodiments, client 102 provides an event reminder for a respective user by playing a predefined music or by vibration.

Optionally, position sensing devices 104 (e.g., a global positioning system (GPS) device) are connected to calendar system 108 via communications network 106. In some embodiments, position sensing device 104 includes a network communication module. In some embodiments, position sensing device 104 includes a sensor to identify a respective user (e.g., a badge reader, a face identification system, etc.). In some embodiments, client 102 includes position sensing device 104 (e.g., a mobile telephone with a GPS capability). Position sensing device 104 can be fixed in one location or portable.

In some embodiments, fewer and/or additional modules, functions or databases are included in calendar system 108 and server 112. The modules shown in calendar system 108 and server 112 represent functions performed in certain embodiments.

Figure 2:
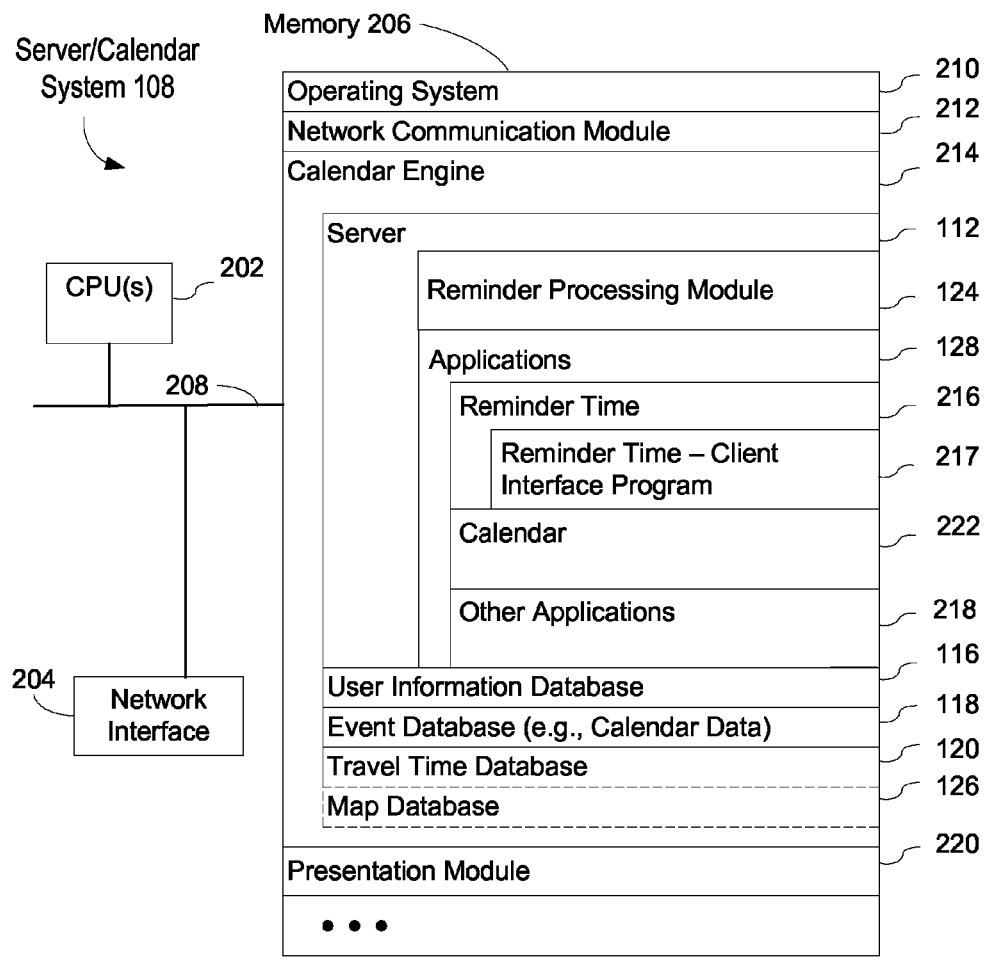
FIG. 2 is a block diagram illustrating a calendar system in accordance with some embodiments.

FIG. 2 is a block diagram illustrating calendar system 108 in accordance with some embodiments. Calendar system 108 typically includes one or more processing units (CPUs) 202, one or more network or other communications interfaces 204, memory 206, and one or more communication buses 208 for interconnecting these components. In some embodiments, the communication buses 208 include circuitry (sometimes called a chipset) that interconnects and controls communications between system components. In some other embodiments, calendar system 108 includes a user interface (not shown) (e.g., a user interface having a display device, a keyboard, and a mouse or other pointing device), but more typically calendar system 108 is controlled from and accessed by various client systems.

Memory 206 of calendar system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a computer readable storage medium. In some embodiments, memory 206, or the non-volatile memory device(s) within memory 206, comprises a non-transitory computer readable storage medium. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting calendar system 108 to other computers (e.g., clients 102) via the one or more network interfaces 204 and one or more communications networks 106 (FIG. 1), such as the Internet, other wide area networks, local area networks, metropolitan area networks, and so on;
- Calendar Engine 214 that receives calendar-related requests from and provides responses to clients 102; and
- Presentation module 220 that formats results from calendar engine 214 for display at respective clients; for example, presentation module 220 may generate a web page or XML document that includes meeting/event information; in some embodiments presentation module 220 is executed by the front end server 122, which comprises one of the servers implementing the calendar system; optionally the presentation module 220 is a module of the calendar engine 214.

In some embodiments, calendar engine 214 includes the following programs, modules and data structures, or a subset or superset thereof:

- a server 112 for managing certain aspects of calendar system 108 including a reminder processing module 124 and applications 128, including calendar application 222 for performing the primary functions of an online calendar system; reminder time application 216 for determining a time to provide an event reminder; reminder time application 216 includes a reminder time-client interface program (or module) 217 for receiving reminder time requests from and generating responses to the requests; application 128 may optionally include other applications 218;

User information database 116 that stores records for users;

Event database 118 that stores information (e.g., metadata) concerning various types of calendars as well as data (e.g., event data, also called event entry data, calendar data, calendar entry data, or calendar event data) from various calendars;

Travel time database 120 that includes travel times between two locations among a plurality of locations; and Optional map database 126 that stores location information (e.g., such as city, campus, campus sub-region, building, floor, and/or building sub-region) concerning various types of locations; and optionally also stores information about pathways and/or travel distance between locations.

Each of the above identified software systems, modules, procedures and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, event database 118 is part of or stored within server 112. In other embodiments, event database 118 is implemented using one or more servers whose primary function is to store and process user information. In some embodiments, travel time database 120 includes map database 126, or vice versa. In some other embodiments, a map server 130 includes travel time database 120 and/or map database 126. For example, map server 130 may be a remote server, at a different physical location from calendar engine server 112. User information database 116 can be implemented on one or more servers.

The actual number of servers used to implement a calendar system 108 and how features are allocated among them will vary from one implementation to another, and may depend in part on the amount of data traffic that the system must handle during peak usage periods as well as during average usage periods, and may also depend on the amount of data stored by the calendar system. Moreover, one or more of the blocks in FIG. 1 may be implemented on one or more servers designed to provide the described functionality. Although the description herein refers to certain features implemented in client 102 and certain features implemented in server 112, the embodiments are not limited to such distinctions. For example, at least some of the features described herein as being part of server 112 can be implemented in whole or in part in client 102, and vice versa.

Figure 3:
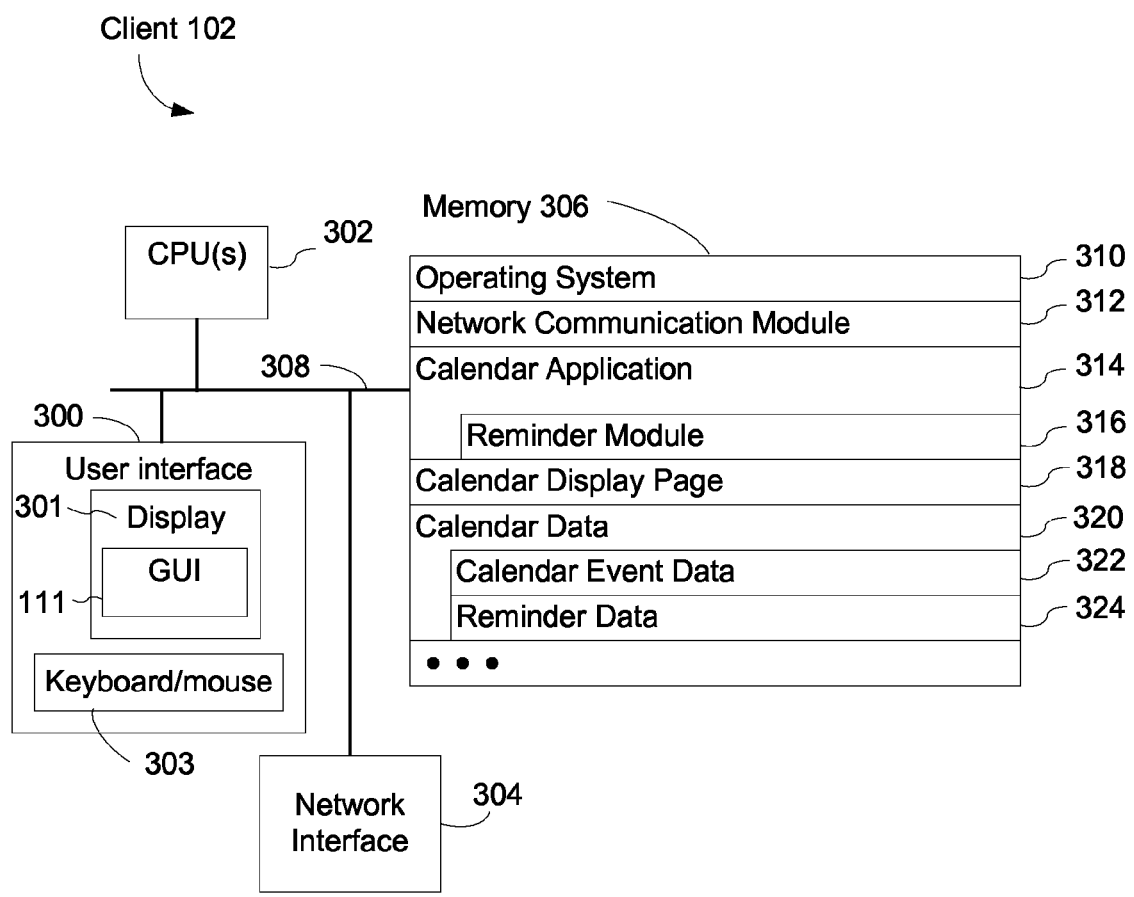
FIG. 3 is a block diagram illustrating a client, in accordance with some embodiments.

FIG. 3 is a block diagram illustrating a client, also called client systems or client devices, in accordance with some embodiments. The clients 102 as shown in these figures are configured for use by a subscriber (also herein called "the user") of calendar system 108. The client includes a user interface 300, which typically includes a display device 301, and one or more input devices 303 such as a keyboard and a mouse or other pointing device. As noted above, client 102 includes a graphical user interface (GUI) 111, which is displayed on the display device 301. Client 102 typically includes one or more processing units (CPUs) 302, one or more network or other network communications interfaces 304, memory 306, and one or more communication buses 308 for interconnecting these components. The communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a computer readable storage medium. In some embodiments, memory 306, or the non-volatile memory device(s) within memory 306, comprises a non-transitory computer readable storage medium. In some embodiments, memory 306 or the computer readable storage medium of memory 306 stores the following programs, modules and data structures, or a subset thereof:

Operating System 310 that includes procedures for handling various basic system services and for performing hardware dependent tasks;

Network Communication Module (or instructions) 312 that is used for connecting client 102 to other computers (e.g., calendar system 108 and other clients 102) via the one or more communications Network Interfaces 304 (wired or wireless) and one or more communication networks 106 (FIG. 1), such as the Internet, other wide area networks, local area networks, metropolitan area networks, and so on;

Calendar Application 314; optionally, the calendar application 314 or an extension, plug-in or toolbar of the browser application includes a reminder module 316 that handles data formatting and/or management tasks in providing an event reminder, at least some of which would otherwise be handled by presentation module 220 (FIG. 2);

Calendar Display Page 318, which is a webpage received from calendar system 108, for displaying calendar data in GUI 111; conference display page 318 may optionally include reminder module 316 (i.e., module 316 is executable code embedded in page 318); and (optional) Calendar Data 320, which is a locally stored subset of the user's calendar; calendar data 320, if stored at the client 102, optionally includes calendar event data 322 (e.g., time and location of an event) and reminder data 324 (e.g., time to provide an event reminder).

In some embodiments, the client 102 may be a "thin client," which includes a calendar application 314 that displays the calendar display page 318 received from calendar system 108. In this embodiment, the client 102 only displays the calendar display page, and executes programs, if any, embedded within the calendar display page 318, but does not include additional software. In some embodiments, programs embedded within the calendar display page format calendar data for display. In thin client embodiments, calendar related processing other than user data input, calendar display, and reminder display are handled by calendar system 108.

Figure 4:
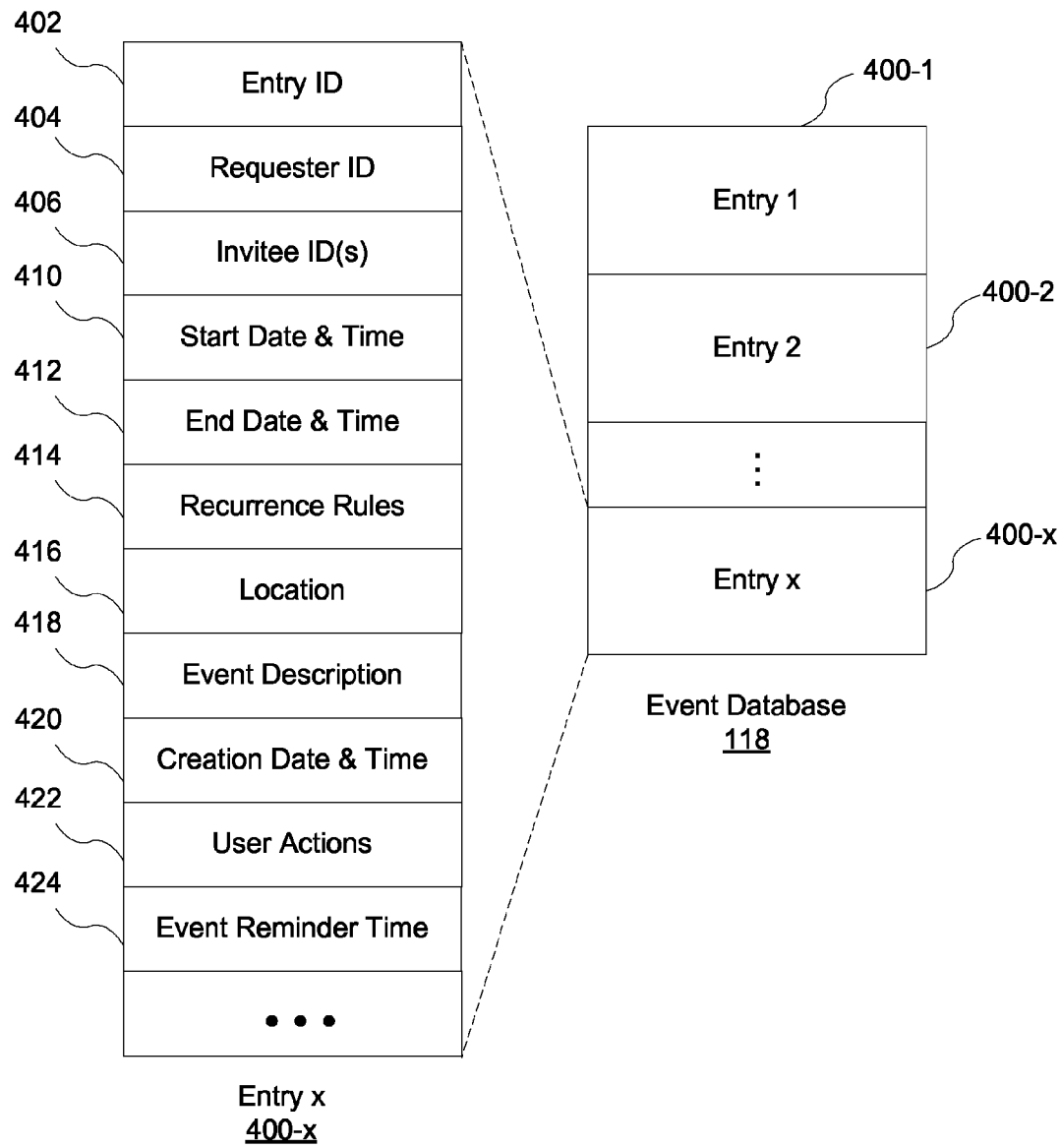
FIG. 4 is a block diagram illustrating an exemplary event database and an exemplary entry in the event database, in accordance with some embodiments.

FIG. 4 is a block diagram illustrating an exemplary event database 118 and an exemplary event entry record 400-*x* in accordance with some embodiments. Event database 118 stores event entry records 400, for example entry 1 (400-1) through entry x (400-*x*), where x represents the number of entries (or the number of entries for a respective user, or the number of entries in a local calendar database at a client 102). An entry 400 includes information for an event, sometimes called a calendar event, such as a meeting.

An event entry (e.g., entry x 400-*x*) includes the following data for a calendar event, or a subset or superset thereof:

Entry ID 402 that uniquely identifies this entry, which corresponds to a particular calendar event;

Requester ID(s) 404 that identifies the requester (or an event organizer) associated with the event entry;

Invitee ID(s) 406 that identifies the invitee(s) (optionally, including or excluding the requester) associated with the calendar entry; the information in this field optionally identifies required attendees, optional attendees, and guests/participants and further optionally identifies the requester. When a respective event entry 400-*x* does not have any invitees, Invitee ID(s) 406 is empty or is not included in the entry 400-*x*;

Start date and time 410 of the event (sometimes called a timestamp);

End date and time 412 of the event (sometimes called a timestamp), or alternatively, event duration (which, in combination with the start date and time 410, provides sufficient information to identify the end date and time of the event);

Recurrence rules 414 (if any) for the event (e.g., whether the meeting occurs only once, daily, weekly, every other week, monthly, yearly, etc., and the number of occurrences or an end date for terminating the series of events);

Location 416 (e.g., building, campus, city, address, etc.) of the event;

Event description 418 (e.g., title; description details; color coding; icon, if any, added to the event; event creator specified event importance, etc.);

Creation date and time 420 (sometimes called a timestamp);

User actions 422 (if any) with respect to the event, such as: information indicating which invitees of an event accepted, declined or tentatively accepted an invitation to the event; attending or not attending the event (if such information is available); user feedback, such as proposal to change the meeting date or time. User actions may also include other user actions, such as replies, comments, or deletion; and Event Reminder Time 424 comprising a time at which the respective user is to be provided a reminder of the respective event. In some embodiments, the event reminder time is set to a reminder time based on a default reminder time interval set by a system administrator or a default reminder time interval for the respective users (e.g., stored in the user information database 116). The event reminder time can be updated when the server determines a different event reminder time for the respective event.

In some embodiments, a separate event database is maintained for each registered user of the system, while in other embodiments the event database 118 records events for multiple users.

Figure 5:
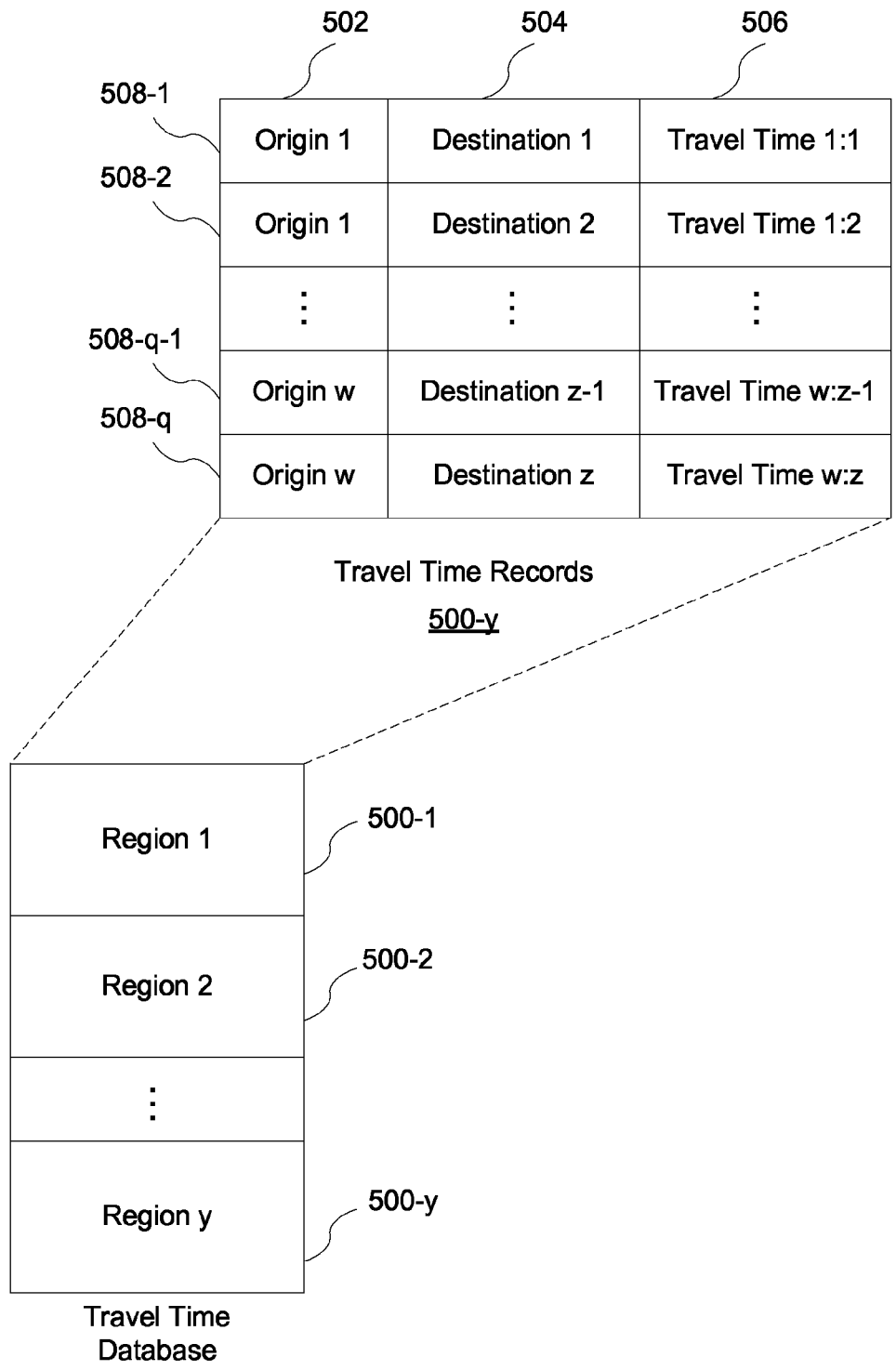
FIG. 5 is a block diagram illustrating an exemplary travel time database and exemplary travel time records, in accordance with some embodiments.

FIG. 5 is a block diagram illustrating an exemplary travel time database 120 and an exemplary travel time records 500-*y* in accordance with some embodiments. Travel time database 120 stores travel time records, for example travel time records 500-1 through travel time records 500-*y*, where y may represent the number of regions. The regions are geographic division of areas covered by travel time database 120. For example, a region can be campus, campus sub-region, building, floor, and/or building sub-region. A travel time record includes travel time information for a respective pair of locations, sometimes called an origin and a destination.

In some embodiments, travel time records 500-*y* includes travel time entries, for example travel time entry 508-1 through travel time entry 508-*q*, where q may represent the number of entries in the set.

In some embodiments, travel time entry 508-*q* includes the following data, or a subset or superset thereof:

Origin 502 that identifies a location where a respective user starts travel to a destination;

Destination 504 that identifies a location where a respective user ends the travel;

Travel Time 506, representing a predicted travel time (duration of travel) for a respective user from Origin 502 to Destination 504; and (Optional) Additional information, such as a time segment for travel time (e.g., the travel time stored in the travel time record is a representative travel time for that time segment), a mode of travel (e.g., walking; riding on a walkway, if available; driving; taking a bus or a subway; taking an elevator; and taking the stairs), a pathway, and major points in the pathway.

In some embodiments, travel time records include multiple travel time entries for a respective pair of an origin and a destination, where a respective entry includes travel time information for each time segment, for each mode of travel, for each pathway. In some embodiments, travel time records do not include the travel time for the reverse direction if the travel time for both directions is similar (e.g., within a predetermined percentage of error). In one example, the travel time database includes the travel time for travel from point A to point B, but does not include the travel time for travel from point B to point A when the travel between point A and point B takes approximately the same amount of time, regardless of the travel direction.

In some embodiments, travel time database 120 is a lookup table. In some embodiments, travel time database 120 is a lookup table including travel times for specific origin-destination pairs. In other embodiments, travel time database 120 includes travel time for a respective pair of locations without identifying which location is the origin and which is the destination.

In some embodiments, travel time database 120 is a sparse lookup table based on a simple model. For example, the model can be based on geographic levels, such as continent, country, state, city, campus, building, building section (floor, wing), etc.

In some embodiments where the system includes a map database 126, the travel time record 500-*y* includes a pointer or link to a location in the map database 126 corresponding to or proximate to the origin and/or the destination.

In some embodiments, travel time database 120 includes travel time records for travel between regions. For example where each region is a respective building on a campus, the travel time database includes travel time between buildings on the campus. In a related example where a shuttle bus travels around the campus, the travel time database includes travel times between shuttle bus stops (on a shuttle bus) and between a respective building and a proximate shuttle bus stop (e.g., by walking).

Figure 6A:
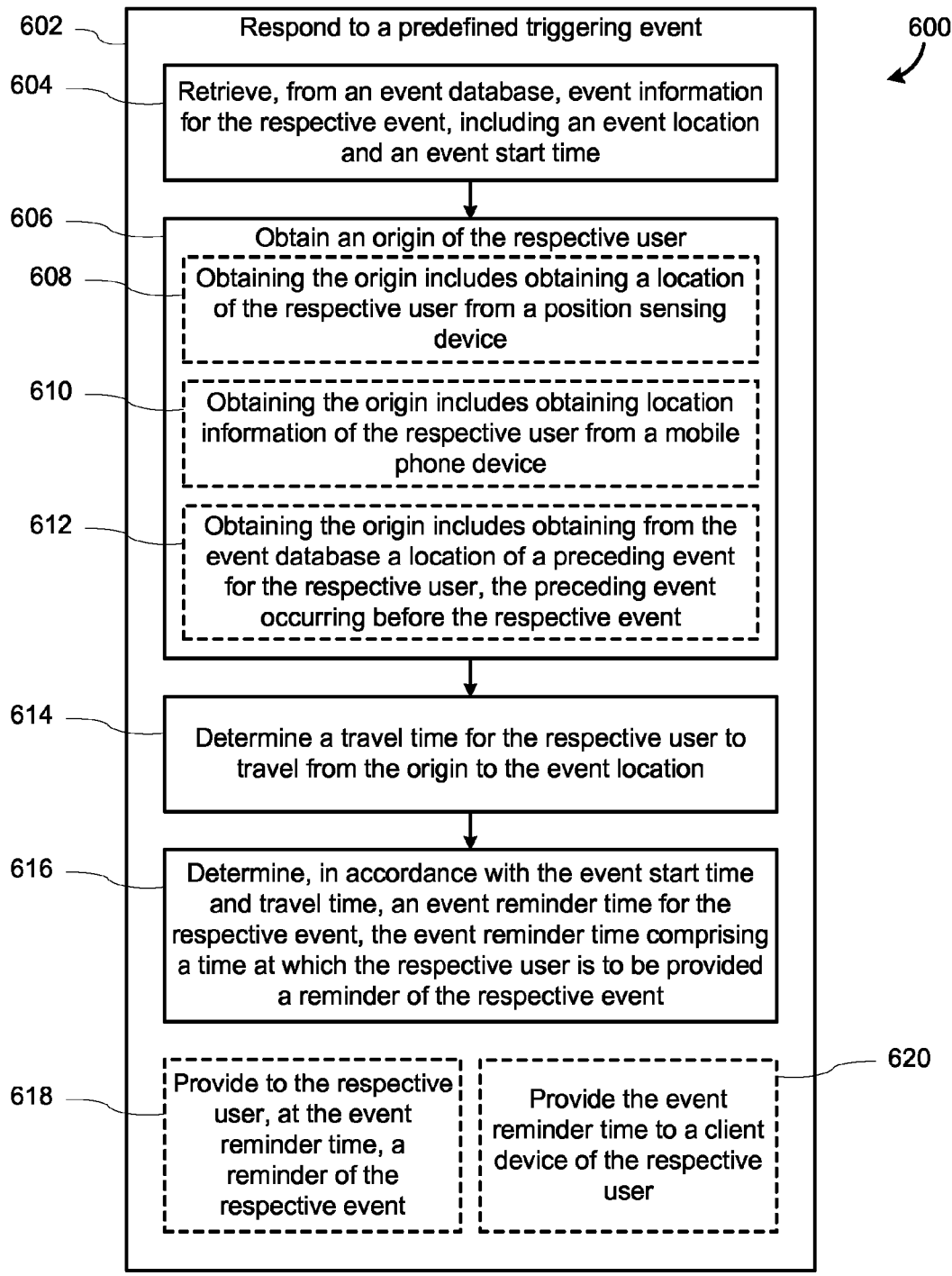
FIGS. 6A and 6B are flowcharts representing a method of determining a time to provide an event reminder, in response to a predefined triggering event, in a calendar system, in accordance with some embodiments.
Figure 6B:
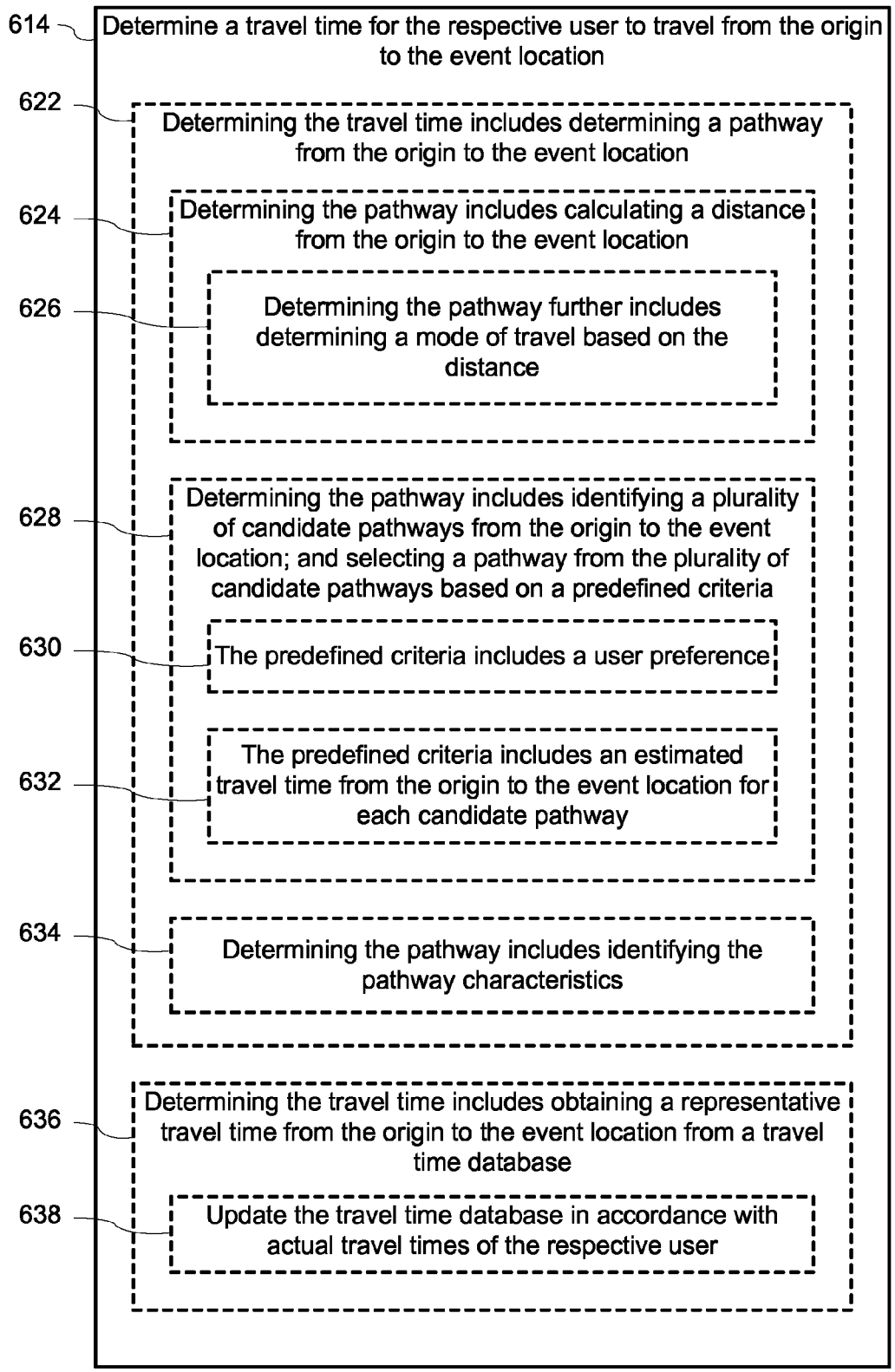

FIGS. 6A and 6B are flowcharts representing a method of determining a time to provide an event reminder for a respective event for a respective user, in response to a predefined triggering event, in a calendar system (e.g., calendar system 108), in accordance with some embodiments. In certain embodiments, calendar system 108 includes a server (e.g., server 112). The server determines a time to provide an event reminder (i.e., an event reminder time) in response to a predefined triggering event (602).

In some embodiments, the predefined triggering event is expiration of a predefined time interval prior to a respective meeting's start time. For example, the predefined time interval can be set to twenty-four hours before a meeting's start time, four hours before the meeting start time, one hour before the meeting's start time, or any other time interval before the meeting. When the predefined time interval is set as twenty-four hours before the meeting, server 112 responds by determining an event reminder time twenty-four hours before the meeting start time. Server 112 determines whether a predefined triggering event has occurred based on: the time provided by a clock (e.g., an internal clock of the server), information stored in the calendar system (e.g., event start time in event database 118), and the predefined time interval. The predefined time interval can be set by a user, a server system administrator or automatically in accordance with a default value.

In some embodiments, the predefined triggering event occurs multiple times, at predefined time interval, prior to the event start time. For example, the predefined time interval can be set to twenty-four hours, one hour, thirty minutes, five minutes, one minute, or any other time interval. When the predefined time interval is set as twenty-four hours, server 112 responds by determining and then updating an event reminder time every twenty-four hours. When the predefined time interval is set as one minute, server 112 responds by determining and then updating the event reminder time every minute.

In some embodiments, each event has a respective predefined time interval for updating the event reminder time. For example, a user A's meeting at 1:00 p.m. may have fifteen minute time interval, whereas a user B's meeting at 3:00 p.m. may have five minute time interval.

In some embodiments, the predefined time interval for updating the event reminder time is a function of time remaining before the event start time. For example, the predefined time interval can be set as one hour for events on the same day, but set as five minutes for events occurring within the next couple of hours.

In some embodiments, the predefined triggering event includes obtaining a location of a respective user. For example, when calendar system 108 receives a location of the respective user from a position sensing device (e.g., position sensing device 104-m in FIG. 1) or a mobile phone device, server 112 responds by determining an event reminder time having a start time with a predefined time range (e.g., having a start time in the next N hours).

In some embodiments, the predefined triggering event includes receiving event information or an update to the event information. In some other embodiments, the predefined triggering event includes receiving a request for an event reminder time from a client (e.g., client 102).

In some embodiments, the predefined triggering event is a combination of two or more of the triggering conditions described above.

In responding to the predefined triggering event (602), the server retrieves, from an event database (e.g., event database 118), event information for the respective event (604). The event information includes an event location and an event start time.

The server also obtains an origin of the respective user (606). In some embodiments, the origin is a default location of the respective user. For example, user information database 116 contains the default location of the respective user (e.g., the location of the respective user's office), and server 112 obtains the origin by retrieving the default location from user information database 116.

In some embodiments, obtaining the origin includes obtaining a location of the respective user from a position sensing device (608). In one example, the position sensing device (e.g., position sensing device 104) is a global positioning system (GPS) device or a device with a GPS capability (e.g., a mobile phone device with a GPS capability). The GPS device (or a device with a GPS capability) determines the location of the respective user, transmits the information to calendar system 108, and server 112 in calendar system 108 obtains the location of the respective user by receiving the information from the device. In another example, the position sensing device is a badge reader. When a respective user scans her badge on the badge reader, the badge reader sends the identity of the respective user and the location of the respective user (alternatively, the location of the badge reader) to calendar system 108, and server 112 in calendar system 108 uses the location in determining an event reminder time. In the other example, the position sensing device is a face identification system. The face identification system sends the identity of the respective user and the location of the respective user (alternatively, the location of the face identification system or a camera of the face identification system) to the server.

In some embodiments, obtaining the origin includes obtaining location information of the respective user from a mobile phone device (610). As described above with reference to the device with GPS capability, a mobile phone with GPS capability determines the location of the respective user, transmits the information to calendar system 108, and server 112 in calendar system 108 obtains the location of the respective user by receiving the information from the mobile phone. A mobile phone without GPS capability uses a mobile phone tracking method to determine the location. The mobile phone tracking method includes determining a location of a mobile phone based on signal power levels from cell towers and locations of the cell towers. For example, a software module (e.g., Google Latitude) can enable mobile phone tracking and allow a respective user to share the location information, for use in other applications, or with other users.

In some embodiments, obtaining the origin includes obtaining from the event database a location of a preceding event for the respective user, the preceding event occurring before the respective event (612). For example, when the respective user has a meeting in a building A between 1:00 and 2:00 p.m. and another meeting in a building B between 2:00 and 3:00 p.m., in determining an event reminder time for the 2:00 p.m. meeting, server 112 retrieves the location of the preceding event (the 1:00 p.m. meeting in this example) from event database 118. This method is especially useful when the calendar system does not have a timely input from a position sensing device, and when the preceding event is at a location different from the user's default location and the estimated travel time (TravelTime) from the location of the preceding event to the next event satisfies a predefined relationship (e.g., Travel Time≧1.5*BetweenTime) to the time gap (BetweenTime), if any, between the preceding event's end time and the start time of the next event.

In some embodiments, or in some circumstances (as described above), server 112 treats the location of the preceding event as the location of the respective user.

In other embodiments, server 112 furthermore retrieves the end time of the preceding event. Then, server 112 determines the location of the respective user based on the location of the preceding event, the default location of the respective user, the end time of the preceding event, the start time of the respective event, and the travel time between the location of the preceding event and the default location. In some embodiments, if a time gap between the preceding event and the respective event is more than a predefined threshold (e.g., one hour), and if the time gap is more than the travel time between the location of the preceding event and the default location, server 112 treats the default location as the origin of the respective user. For example, when the preceding event ends at 1:00 p.m. and the respective event starts at 3:00 p.m., the estimated travel time for the respective user to travel from the location of the preceding event to the default location (e.g., the respective user's office) is ten minutes, and the predefined threshold is one hour, the time gap is two hours, and thus the time gap is more than the predefined threshold. Then, server 112 treats the default location of the respective user as the origin of the respective user, based on the assumption that the respective user will return (or has returned) to the default location. In other embodiments, when the time gap between two successive events (i.e., with no intervening events noted in the user's calendar) is more than the sum of the travel time between the location of the preceding event and the default location and the travel time between the default location and the event location, server 112 treats the default location as the origin of the respective user for purposes of determining the event reminder time for the user.

In some embodiments, obtaining the origin of the respective user (606) includes determining the likelihood of attendance of the preceding event. The likelihood of attendance is calculated, for example, from the past attendance of the respective user, acceptance status of the preceding event (user actions 422 in entry 400 for the preceding event), past acceptance of event/meeting requests from a requester requesting the preceding event by the respective user, and schedule conflict for the respective user. The past attendance, acceptance status, past acceptance, and/or schedule conflict can be determined, for example, in accordance with information stored in event database 118. In some embodiments, the location of the preceding event is used as the origin only if the likelihood of attendance (of the preceding event) exceeds a predefined threshold (e.g., 50%, 60%, 70%, 80%, or a percentage defined by the respective user or a system administrator).

In some embodiments, obtaining the origin includes a combination of two or more of the methods described above. In some embodiments, the origin is determined in accordance with the recency of the location information. In some other embodiments, the origin is determined also in accordance with the accuracy and resolution of respective location information or the respective method (e.g., GPS, mobile phone based on mobile phone tracking, obtaining the origin by obtaining the location of the preceding event location, etc.) for obtaining the location information.

In some cases, a user or a requester may provide inexact location information for an event or meeting (hereinafter called a meeting, for convenience). An example of inexact location information is "corner conference room," with no indication of the building, floor, or even the city in which the meeting is to occur. Typically, inexact location information does not match an entry in travel time database 120. In some embodiments, the calendar system attempts to determine the location of a meeting despite the use of inexact location information, in order to be able to provide distance-aware reminders, or distance-aware warnings of scheduling conflicts. In most circumstances, identifying the building in which a meeting is most likely to occur is sufficient for providing distance-aware event reminders or distance-aware warnings of scheduling conflicts. In some of these embodiments, the calendar system identifies the likely location of a meeting based on either the default locations of the participants (e.g., using the building-level default location shared by the most participants, or in the absence of any such location, the default location of the requester), or the locations (inferred, or known) of the participants prior to the event or meeting. For example, if the location(s) of event(s) attended by participants prior to the event having the inexactly location information can be determined, then that information can be used to identify a likely location of the meeting. In these embodiments, a set of rules is used to determine what information to use for establishing the likely location of a meeting. Such rules typically give preference to information considered most likely to be accurate, and give decreasing preference to sources of information considered to be increasing less likely to be accurate.

In some embodiments, when event information for a preceding event (sometimes called a "preceding meeting," for convenience, although the preceding event need not be a "meeting") with multiple attendees includes inexact location information, server 112 identifies the actual location of the preceding event in accordance with the locations of one or more attendees (e.g., obtained from position sensing devices or mobile phone devices associated with the one or more attendees). In some embodiments, server 112 identifies the actual location of the preceding event in accordance with the locations of two or more attendees, to improve accuracy in identifying the actual location (e.g., averaging, most populated location, etc.). In some embodiments, server 112 accesses and uses the invitee acceptance status of a preceding event (user actions 422 in entry 400 for the preceding event), so as to avoid using the location of a preceding event as the likely preceding location of invitees who have not accepted an invitation to the preceding event. Similarly, when the information for a recurring event includes inexact location information, the actual location of the recurring event can be determined in accordance with the historic locations of one or more attendees (e.g., obtained from position sensing devices or mobile phone devices associated with the one or more attendees) of prior instances of the recurring event.

In some embodiments, when server 112 cannot determine the location of a meeting, server 112 uses a default location for the meeting (e.g., the default location of the requester) to determine travel time. In some other embodiments, server 112 does not provide distance-aware meeting reminders and/or distance aware warnings of scheduling conflicts, with respect to a particular meeting or a subsequent meeting, when the location of the particular meeting is unknown due to the provision of inexact location information by the meeting requester.

After obtaining the origin of the respective user, server 112 determines a travel time for the respective user to travel from the origin to the event location (614). For example, server 112 determines a travel time by retrieving a travel time corresponding to the origin and the destination (e.g., the event location) from travel time database 120.

In some embodiments, determining the travel time includes additional steps as described with reference to FIG. 6B.

In some embodiments, determining the travel time includes determining a pathway from the origin to the event location (622). When there are multiple pathways from an origin to a destination, server 112 determines a pathway and determines the travel time corresponding to the determined pathway. In some embodiments, after determining a pathway, server 112 determines the travel time by retrieving the travel time from travel time database 120 based on the origin, the event location, and the determined pathway.

In some embodiments, the pathway consists of a plurality of segments, and server 112 determines the travel time by retrieving the travel time for the plurality of segments and summing up the retrieved travel times. In one example, the pathway from the building A to the building B includes a segment from the building A to a building C, and a segment from the building C to the building B. Server 112 retrieves the travel for each segment, and adds the two travel times to determine the travel time from the building A to the building B.

In some embodiments where travel time database 120 is a sparse lookup table based on geographic level, server 112 determines the travel time by retrieving the travel time for each geographic level, and summing up the retrieved travel times. In one example, the travel involves traveling from a building D in a city X to a building E in a city Y, where the user preference is to drive between the two cities. One potential pathway includes walking from the building D to a car in a first parking lot; driving from the first parking lot to a highway; driving on the highway from the city X to the city Y; driving from the highway to a second parking lot next to the building E; and walking from the second parking lot to the building E. Server 112 determines the travel time by adding travel time for each segment of the pathway (e.g., 5 minute walking to the first parking lot; 10 minute driving to the highway; 1 hour driving to the city Y; 20 minute driving to the second parking lot; 3 minute walk to the building E).

In some other embodiments, server 112 ignores travel times for geographic levels lower than the most significant geographic level by a predetermined threshold. In the above example, if the geographic levels include "intercity driving", "city driving" (e.g., driving to and from a highway), "long distance walking", and "short distance walking" (e.g., walking between a parking lot and a building), the most significant geographic level is the intercity driving between the two cities. If the predetermined threshold is one level, the "short distance walking" is lower than the "intercity driving" by more than one level. Then, server 112 ignores the travel time for short distance walking (e.g., the travel from the building D to the first parking lot and the travel from the second parking lot to the building E) in determining the travel time from the origin to the event location. However, as "city driving" is within one level from the "intercity driving", server 112 includes the city driving times in determining the travel time. In this example, server 112 adds the travel time for the most significant geographic level (intercity driving: 1 hour from the city x to the city Y) and the travel times for city driving (10 minute driving to the highway, and 20 minute driving from the highway) to determine the travel time from the origin to the event location.

In some embodiments, determining the pathway includes calculating a distance from the origin to the event location (624). For example, when calendar system 108 includes or has access to a map database 126, server 112 retrieves the distance information from the map database 126. In some embodiments, server 112 calculates the distance from the origin to the event location by adding distances between intermediate points available in a map database. In one example, the map database 126 does not include a distance between the building A and the building B, but includes the distance between the building A and the building C, and the distance between the building C and the building B. Then, server 112 calculates the distance from the building A to the building B by adding the two distances. In some other embodiments, when calendar system 108 includes or has access to a map server 130, server 112 requests and receives the distance information from the map server 130 at least for a subset of the segments between the origin and the destination.

In some embodiments, server 112 determines the pathway in accordance with the distance. For example, server 112 selects the pathway with the shortest distance.

In some embodiments, determining the pathway further includes determining a mode of travel based on the distance (626). In one example, user preferences for a respective user stored in user information database 116 includes that the respective user prefers to walk when the travel distance is less than 2 miles and prefers to drive a car when the travel distance is more than 2 miles. In this example, if the distance from an origin to a destination is less than 2 miles, server 112 determines that the mode of travel for the pathway is walking.

In some embodiments, determining the travel time includes determining the travel time based on the mode of travel. In one example, server 112 determines the travel time by dividing the pathway distance by an estimated speed of travel. In another example in which multiple modes of travel are possible, server 112 determines the travel time by dividing the pathway distance by an estimated speed of travel for the respective mode of travel. In some embodiments, travel time database 120 includes the travel time records for a plurality of modes of travel from origins to destinations, and server 112 retrieves the travel time for the mode of travel.

In some embodiments, determining the pathway includes identifying a plurality of candidate pathways from the origin to the event location, and selecting a pathway from the plurality of candidate pathways based on a predefined criteria (628). In some embodiments, travel time database 120 includes a plurality of pathways from the origin to the event location. In some other embodiments, map database 126 or map server 130 provides a plurality of pathways from the origin to the event location. Server 112 identifies a plurality of candidate pathways by retrieving/requesting the pathways from travel time database 120, map database 126, or map server 130.

In some embodiments, server 112 selects a pathway that best matches the predefined criteria. Alternatively, server 112 selects one of the pathways that match the predefined criteria.

In some embodiments, the predefined criteria includes a user preference (630). For example, the user preference (e.g., stored in user information database 116) can be any of the set consisting of: highway v. local road, going through a building v. going around the building, driving v. public transportation, and driving v. walking. The user preference can also include mobility limitations of the user. In some embodiments, server 112 compares respective pathways and the user preference, and deselects pathways that do not meet the user preferences. For example, when the user preferences include avoiding stairways, server 112 deselects pathways that include travel on stairways from the identified plurality of pathways.

In some embodiments, the predefined criteria includes an estimated travel time from the origin to the event location for each candidate pathway (632). For example, server 112 obtains an estimated travel time for each candidate pathway by retrieving the travel time from travel time database 120. Then, server 112 selects a pathway with the shortest travel time.

In some embodiments, determining the pathway includes identifying the pathway characteristics (634). For example, pathway characteristics include different floors, different buildings, potential traffic, distance further than the walking distance for a respective user (and therefore having to use a mode of travel other than walking), etc. In various embodiments, server 112 identifies the pathway characteristics by retrieving the pathway characteristics from one or more of: travel time database 120, map database 126, and map server 130.

In some embodiments, determining the travel time includes obtaining a representative travel time from the origin to the event location from a travel time database (636). In one example, travel time database 120 includes a representative travel time, and server 112 obtains the representative travel time from travel time database 120. In some other embodiments, server 112 obtains the representative travel time by adding representative travel time for respective segments for the pathway. In other embodiments, server 112 obtains the representative travel time by calculating respective travel time for a respective segment (e.g., by dividing the distance for the respective segment by an estimated speed of travel).

In some embodiments, server 112 updates travel time database 120 in accordance with actual travel times of the respective user (638). For example, server 112 determines the arrival of the respective user at the event location by comparing the location of the respective user and the event location. Then, server 112 updates the travel time database in accordance with actual travel time of the respective user. In some other embodiments, server 112 tracks the location of the respective user from a position sensing device 104 or a mobile phone device and determines the travel time for respective segment of the pathway that the respective user has traveled. Then server 112 updates travel time database 120 for the respective traveled segment.

In some embodiments, determining a travel time includes rounding the travel time based on a predetermined time increment. In one example when the predetermined time increment is five minutes and the travel time is fourteen minutes, server 112 determines the travel time to be fifteen minutes by rounding fourteen minutes to the nearest increment of five minutes (i.e., fifteen is the closest number to fourteen among increments of five). In another example when the predetermined time increment is ten minutes and the travel time is twenty-one minutes, server 112 determines the travel time to be twenty minutes (i.e., twenty is the closest number to twenty-one among increments of ten).

In some other embodiments, determining a travel time includes rounding up the travel time based on a predetermined time increment. In one example when the predetermined time increment is five minutes and the travel time is twelve minutes, server 112 determines the travel time to be fifteen minutes by rounding up twelve minutes to the closest five minute increment (i.e., fifteen is the smallest number among increments of five that is not less than twelve). In another example, when the predetermined time increment is ten minutes and the travel time is twenty-one minutes, server 112 determines the travel time to be thirty minutes (i.e., thirty is the smallest number among increments of ten that is not less than twenty-one).

After determining the travel time, server 112 determines an event reminder time for the respective event, in accordance with the event start time and travel time (616). The event reminder time includes a time at which the respective user is to be provided a reminder of the respective event. In some embodiments, the event reminder time is a time preceding the event start time by the travel time. For example, if the event start time is 3:00 p.m. and the travel time is one hour, the event reminder time is 2:00 p.m. (one hour before 3:00 p.m.). In another example, if the event start time is 11:00 a.m. and the travel time is fifteen minutes, the event reminder time is 10:45 a.m. (fifteen minutes before 11:00 a.m.).

In some embodiments, server 112 stores the event reminder time in the event database 118. For example, server 112 updates the event database 118 with the event reminder time.

In some embodiments, determining the event reminder time includes adjusting the event reminder time in accordance with a buffer. The buffer is an additional time interval to provide the respective user time to prepare for travel or to account for potential delays during the travel. In some embodiments, the buffer is a fixed amount of time. In one example, when the event reminder time based on travel time is 2:45 p.m. and the buffer is five minutes, server 112 revises the event reminder time to 2:40 p.m. (i.e., five minutes before 2:45 p.m.). In other embodiments, the buffer is a predetermined fraction of the travel time. In one example where the travel time is one hour and the predetermined percentage is ten percent, server 112 revises the event reminder time by six minutes (i.e., ten percent of one hour). In some embodiments, the buffer is a sum of both a fixed amount of time and a fraction of the travel time.

In some embodiments, server 112 maintains two event reminder times: one based on a predetermined time interval before the event, and the other based on the origin of the respective user and the travel time. In some embodiments, server 112 provides at least one event time reminder, based on the predetermined time interval before the event. In some other embodiments, server 112 does not provide a reminder if the respective user is already at the event location before the event reminder time.

In some embodiments, the server provides a reminder of the respective event to the respective user at the event reminder time (618). In one example, server 112 indicates the event reminder time by updating the calendar data 120 for the respective user. In another example, server 112 provides a calendar display page containing the event reminder time to the respective user.

In some embodiments, server 112 updates the reminder time at a predetermined time interval prior to the event. For example when the predetermined time interval is one hour before a respective event, server 112 determines the event reminder time one hour before the event. In addition, server 112 optionally updates the predetermined time interval (e.g., to thirty minutes) so that server 112 updates the event reminder time at the revised time interval prior to the event (e.g., thirty minutes prior to the event) to account for any changes (e.g., change to the event location, cancellation, travel of the respective user) that may occur during the intervening time (i.e., from one event reminder time update to a next event reminder time update).

In some embodiments, the server provides the event reminder time to a client device of the respective user (620). For example, server 112 sends the event reminder time to client 102 of the respective user, and client 102 presents the reminder to the respective user at the event reminder time. For example, the event reminder time is provided to one or more clients 102 associated with the user, and at least one of those clients presents the reminder to the respective user at the event reminder time.

Figure 7:
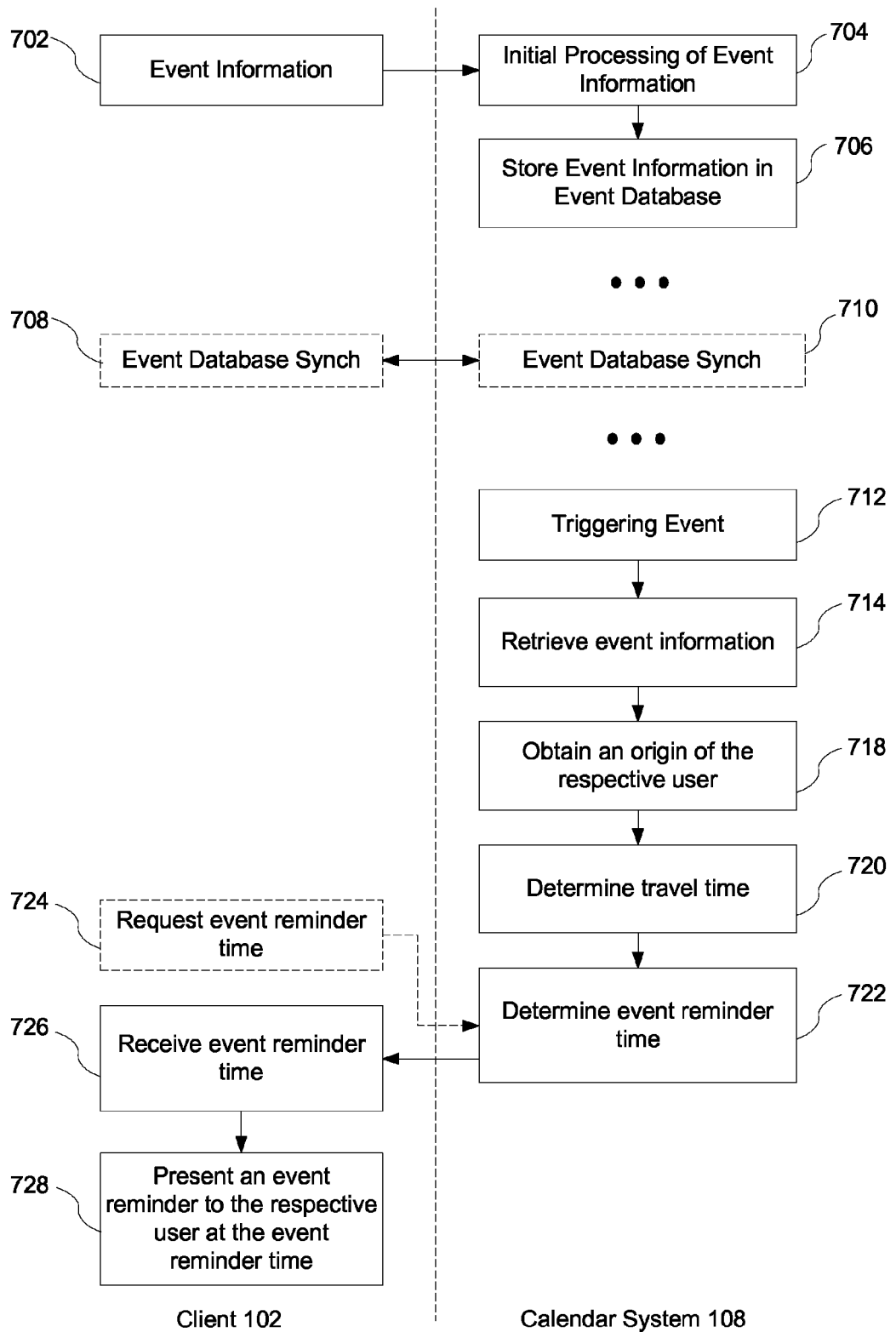
FIG. 7 is a high-level flowchart illustrating processes performed by a client and a server system, in accordance with some embodiments.

FIG. 7 is a flowchart illustrating processes performed by a client 102 and a calendar system 108, in accordance with some embodiments. It will be appreciated by those of ordinary skill in the art that one or more of the acts described may be performed by hardware, software, or a combination thereof, as may be embodied in one or more computing systems. In some embodiments, portions of the process performed by calendar system 108 can be performed by client 102.

Client 102 sends event information to calendar system 108 (sometimes called sever system 108) (702), and calendar system 108 performs initial processing of the event information (704). In some embodiments, initial processing includes parsing the event information to extract information recordable in an event database entry (e.g., event database entry 400-x in FIG. 4). Calendar system 108 stores event information in event database (706).

In some embodiments, client 102 initiates event database synchronization (708). In other embodiments, calendar system 108 initiates event database synchronization (710). Once event database synchronization is initiated, client 102 and calendar system 108 communicate with each other to synchronize the client and server event databases. In some embodiments, synchronizing the event databases includes synchronizing event reminder time. In some embodiments when client 102 determines an event reminder time, calendar system 108 copies the event reminder time in client 102 during event database synchronization. In some other embodiments when the calendar system 108 determines an event reminder time, client 102 copies the event reminder time in calendar system 108 during event database synchronization. In other embodiments when both the calendar system 108 and the client 102 determine an event reminder time, whether client 102 copies from calendar system 108 or vice versa depends on whether client 102 or calendar system 108 determined the event reminder time last. Stated another way, during event database synchronization, the last determined value of a respective event reminder time prevails and is copied to the other system. After the event database synchronization, the event reminder time in client 102 matches the event reminder time in calendar system 108.

Calendar system 108 receives a triggering event (712), and retrieves event information (714). In some embodiments, calendar system 108 retrieves event information from event database 118.

In addition to retrieving event information, calendar system 108 obtains an origin of the respective user (718). In some embodiments, the calendar system 108 obtains the origin of the respective user as described with reference to operation 606 (FIG. 6A).

After obtaining the origin of the respective user, calendar system 108 determines a travel time to the event location (720). In some embodiments, calendar system 108 determines the travel time as described with reference to operation 614.

After determining the travel time, calendar system 108 determines an event reminder time (722). In some embodiments, calendar system 108 determines the event reminder time as described with reference to operation 616.

In some embodiments, client 102 requests the event reminder time (724), and calendar system 108 sends the event reminder time to client 102 in response to the request. In other embodiments, calendar system 108 transmits the event reminder time to client 102 without a request from client 102. For example, calendar system 108 sends the event reminder time at a predetermined time. The predetermined time can be, for example, a predetermined time of the day, or a predetermined time interval before the event reminder time.

Client 102 receives the event reminder time (726). In some embodiments, client 102 stores the event reminder time as reminder data (e.g., reminder data 324 in FIG. 3).

Client 102 presents an event reminder to the respective user at the event reminder time (728). In some embodiments, reminder module 316 (in FIG. 3) presents the event reminder to the respective user at the event reminder time. In other embodiments, the event reminder is presented as part of a calendar display page (e.g., calendar display page 318 in FIG. 3).

Figure 8A:
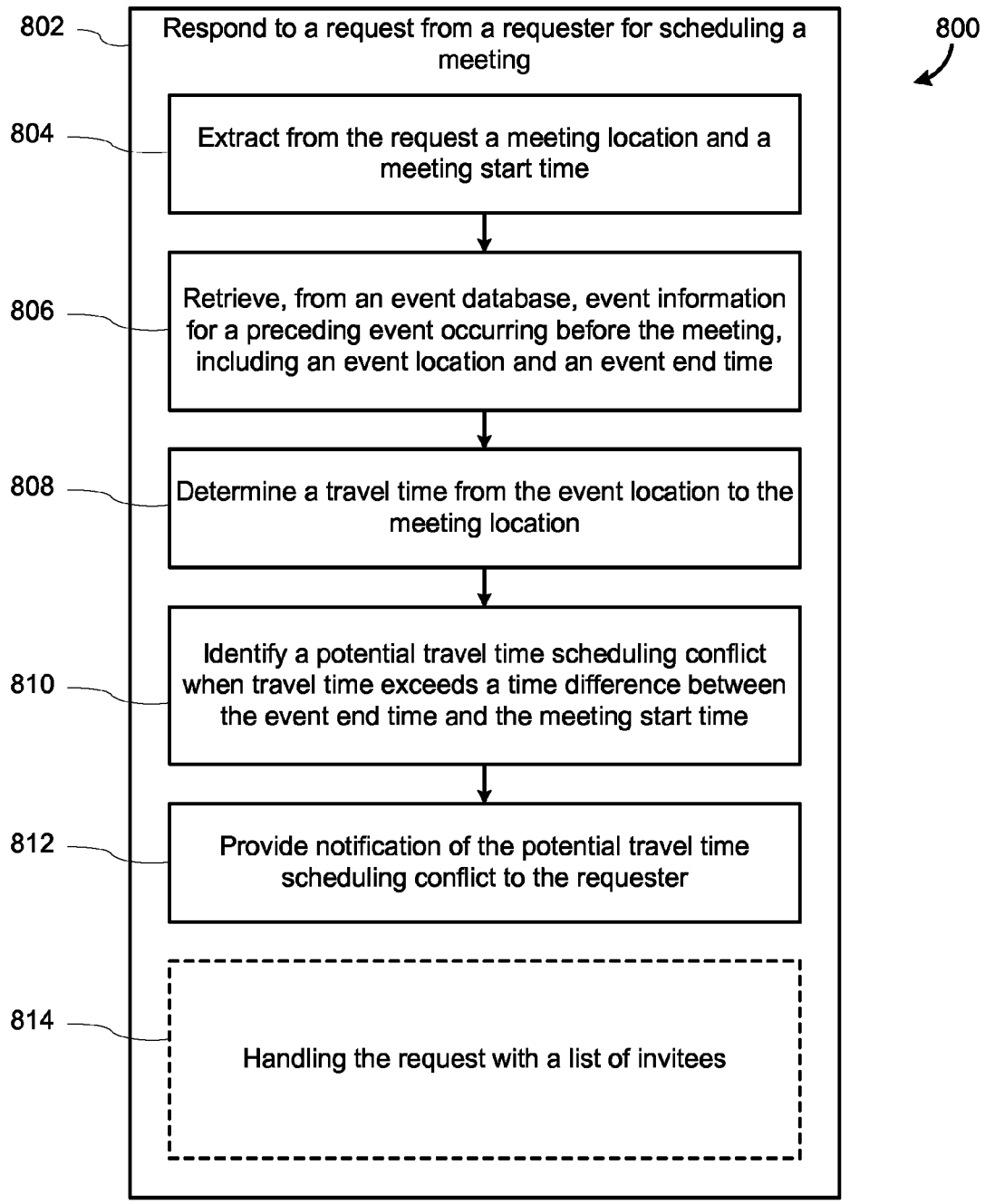
FIGS. 8A-8C are flowcharts representing a method of providing scheduling assistance, in response to a request from a requester for scheduling a meeting.
Figure 8B:
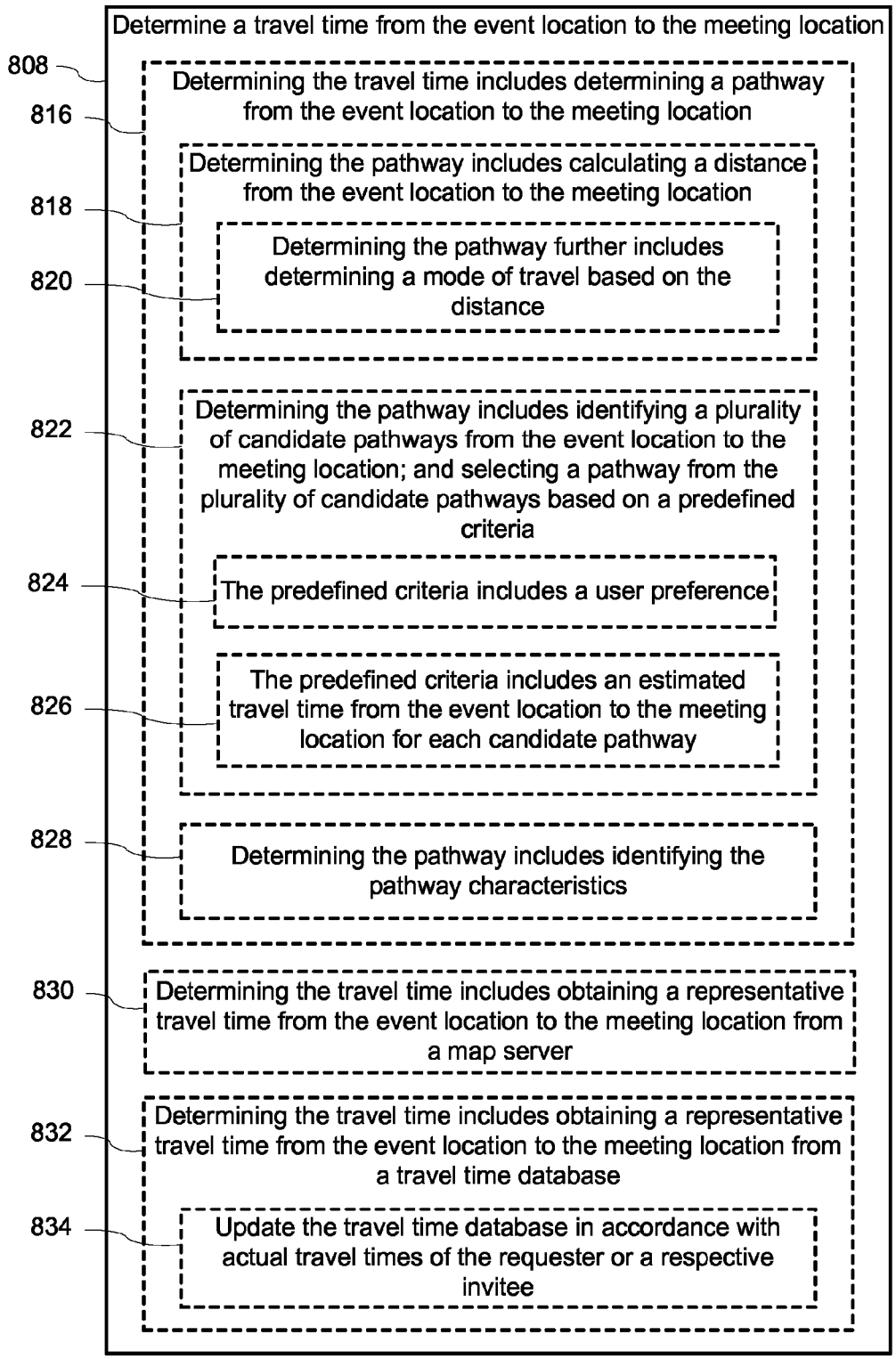
Figure 8C:
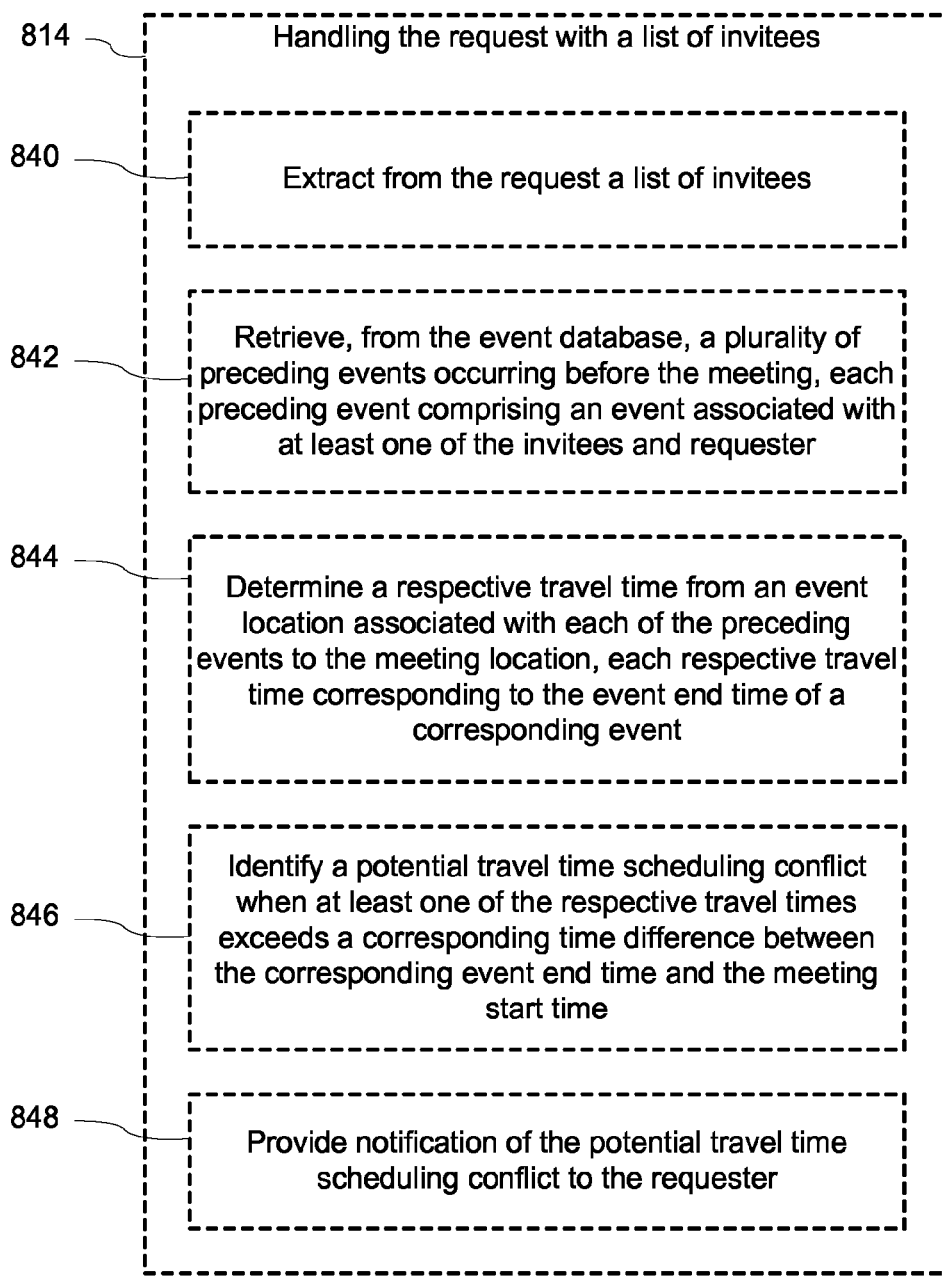

FIGS. 8A-8C are flowcharts representing a method 800 of providing scheduling assistance, in response to a request from a requester for scheduling a meeting, in a calendar system (e.g., calendar system 108), in accordance with some embodiments. In certain embodiments, calendar system 108 includes a server (e.g., server 112). The server provides scheduling assistance in response to a request from a requester for scheduling a meeting (802).

In some circumstances, the request from a requester for scheduling a meeting includes a request for scheduling a new meeting. In some other circumstances, the request for scheduling a meeting includes a request for rescheduling a meeting in the calendar (e.g., changing the meeting time). In yet other circumstances, the request for scheduling a meeting includes a request to add one or more additional invitees to a meeting in the calendar.

The request includes a meeting location and a meeting start time. The server extracts the meeting location and the meeting start time from the request (804). In some embodiments, the request is stored in event database 118. In other embodiments, the request is stored in the front end server 122, or in memory 206 of server 108 or server 112. Server 112 retrieves the request and extracts the meeting location and the meeting start time from the request. Any calendar system records linked to or associated with the request that contain meeting time and start time information are considered to be part of the request for purposes of extracting information such as the meeting location and meeting start time.

The server also retrieves, from an event database, event information for a preceding event occurring before the meeting, including an event location and an event end time (806). In some embodiments, retrieving event information for the preceding event includes identifying the preceding event, if any. When multiple events occur before a meeting, the preceding event is a closest event that occurs before the meeting. For example when the requester is scheduled to attend one-hour meetings at 9:00 a.m., 12:00 p.m., and 3:00 p.m., and a newly requested meeting starts at 2:00 p.m., server 112 identifies the 12:00 p.m. meeting as the preceding event occurring before the 2:00 p.m. meeting. After identifying the 12:00 p.m. meeting as the preceding event, server 112 retrieves event information for the 12:00 p.m. meeting from the event database. In some embodiments, the event information stored in the event database includes the event start time and the duration instead of the event end time. In such embodiments, server 112 determines the event end time based on event information stored in the event database, such as the event start time and the duration.

After retrieving the event location and the event end time, the server determines travel time from the event location to the meeting location (808). For example, server 112 determines a travel time by retrieving a travel time corresponding to the event location (as a starting point) and the meeting location (as a destination) from travel time database 120.

In some embodiments, determining the travel time includes identifying a location near the event location or the meeting location. The identified location is a location for which travel time database 120 includes travel time information. In some embodiments, determining the travel time also includes determining whether travel time database 120 includes or does not include travel time information for the event location or the meeting location.

In one example, when the requester travels from the event location, conference room ABC, to the meeting location, conference room XYZ, travel time database 120 does not include travel time information for the conference room ABC. When server 112 determines that travel time database 120 does not include travel time information for conference room ABC, it identifies a location near the event location, for example a conference room DEF. In this example, travel time database 120 includes the travel time from the conference room DEF to the conference room XYZ.

In some embodiments, server 112 identifies the location near the event location or the meeting location in accordance with the map server 130 and travel time database 120. In some other embodiments, travel time database 120 includes location information for the starting point (i.e., origin) and the ending point (i.e., destination). For example, travel time database 120 additionally includes that the conference room DEF is located in the north-west corner of the eighth floor. If the map database 126 or the map server 130 includes information that the conference room ABC is also located in the north-west corner of the eighth floor, server 112 determines that the conference rooms ABC and DEF are located close to each other, and that the travel time from the conference room DEF represents the travel time from the conference room ABC.

In some embodiments, determining the travel time includes additional steps as described with reference to FIG. 8B.

In some embodiments, determining the travel time includes determining a pathway from the event location to the meeting location (816). When there are multiple pathways from the event location to the meeting location, server 112 determines a pathway and determines the travel time corresponding to the determined pathway. In some embodiments, after determining a pathway, server 112 determines the travel time by retrieving the travel time from travel time database 120 based on the event location, the meeting location, and the determined pathway.

In some embodiments, determining the pathway includes calculating a distance from the event location to the meeting location (818). For example, when calendar system 108 includes or has access to a map database 126, server 112 retrieves the distance information from the map database 126. In some embodiments, server 112 calculates the distance from the event location to the meeting location by adding distances between intermediate points available in the map database.

In some embodiments, determining the pathway further includes determining a mode of travel based on the distance (820). As described with reference to operation 626, in one example user preferences for a respective user stored in user information database 116 includes that the respective user prefers to walk when the distance is less than 2 miles and prefers to drive a car when the travel distance is more than 2 miles. In this example, if the distance from an origin to a destination is less than 2 miles, server 112 determines that the mode of travel for the pathway is walking.

In some embodiments, determining the pathway includes identifying a plurality of candidate pathways from the event location to the meeting location, and selecting a pathway from the plurality of candidate pathways based on a predefined criteria (822). As discussed above with reference to operation 628, in some embodiments, travel time database 120 includes a travel time information for a plurality of pathways from the event location (as an origin) to the meeting location (as a destination). In some other embodiments, map database 126 or map server 130 provides a plurality of pathways from the event location to the meeting location. Server 112 identifies a plurality of candidate pathways by retrieving/requesting the pathways from travel time database 120, map database 126, or map server 130.

When more than one pathway matches the predefined criteria, server 112 selects one of pathways that match the predefined criteria. In some embodiments, server 112 selects a pathway that best matches the predefined criteria.

In some embodiments, the predefined criteria include a user preference (824). As described with reference to operation 630, the user preference can be one of the set consisting of: high way v. local road, going through a building v. going around the building, driving v. public transportation, and driving v. walking. The user preference can also include mobility limitations of the user. In some embodiments, the server compares respective pathways with the user preference, and deselects pathways that do not meet the user preferences. For example, when the user preferences include avoiding stairways, the server deselects pathways that include travel on stairways from the identified plurality of pathways.

In some embodiments, the predefined criteria include an estimated travel time from the event location to the meeting location for each candidate pathway (826). For example, server 112 obtains an estimated travel time for each candidate pathway by retrieving the travel time from travel time database 120. Then, server 112 selects a pathway with the shortest travel time.

In some embodiments, determining the pathway includes identifying the pathway characteristics (828). As described with reference to operation 634, pathway characteristics include for example, different floors, different buildings, potential traffic, distance further than the walking distance for a respective user (and therefore having to use a mode of travel other than walking), etc. In various embodiments, server 112 identifies the pathway characteristics by retrieving the pathway characteristics from one or more of: travel time database 120, map database 126, and map server 130.

In some embodiments, determining the travel time includes obtaining a representative travel time from the event location to the meeting location from a map server (830). In various embodiments, when server 112 includes or has access to map server 130, server 112 obtains the representative travel time from map server 130. In some embodiments, map server 130 is a remote map server, which is located remotely from calendar system 108.

In some embodiments, determining the travel time includes obtaining a representative travel time from the event location to the meeting location from a travel time database (832). As described with reference to operation 636, in some embodiments, travel time database 120 includes a representative travel time, and server 112 obtains the representative travel time from travel time database 120. In some other embodiments, server 112 obtains the representative travel time by adding representative travel time for respective segments for the pathway. In other embodiments, server 112 obtains the representative travel time by calculating respective travel time for a respective segment (e.g., by dividing the distance for the respective segment by an estimated speed of travel).

In some embodiments, the server updates the travel time database in accordance with actual travel times of the respective user (834). As described with reference to operation 638, server 112 for example, determines the arrival of the respective user (e.g., a requester) at the event location by comparing the location of the respective user and the event location. In some other embodiments, server 112 tracks the location of the respective user from a position sensing device 104 or a mobile phone device and determines the travel time for a respective segment of the pathway that the respective user has traveled. Then the server updates travel time database 120 for respective traveled segment.

After determining the travel time, the server identifies a potential travel time scheduling conflict when the travel time exceeds a time difference between the event end time and the meeting start time (810 in FIG. 8A). For example, the preceding event ends at 3:00 p.m., and the requested meeting starts at 3:30 p.m. If the travel time from the event location to the meeting location is more than 30 minutes (e.g., 45 minutes), the travel time exceeds a time difference between the event end time and the meeting start time, and server 112 identifies a potential travel time scheduling conflict.

The server provides notification of the potential travel time scheduling conflict to the requester (812). In some embodiments, the notification includes just a fact that there is a potential travel time scheduling conflict. For example, the notification includes a flag that indicates a potential travel time scheduling conflict. Optionally, if no potential travel time scheduling conflict is identified (at operation 810), a flag or other indicator is produced to indicate that no potential travel time scheduling conflict has been identified. Alternatively, if no potential travel time scheduling conflict is identified (at operation 810), no notification of a scheduling conflict is provided to the requester. In other embodiments, the notification of the potential travel time scheduling conflict includes other information including two or more selected from the group consisting of: the preceding event end time, the meeting start time, the travel time, and identification of the person (e.g., an invitee) for whom the potential travel time scheduling conflict has been identified. Based on the information included in the notification, the requester may decide to schedule the meeting at the requested time despite the potential travel time scheduling conflict, or may decide to schedule the meeting at another time or location.

In some embodiments, server 112 provides the notification by transmitting the notification to the client 102 associated with the requester. In other embodiments, the server posts the notification, which can be retrieved by client 102. In some embodiments, server 112 includes notification as part of calendar display page (e.g., calendar display page 318 as stored in client 102). In other embodiments, server 112 provides notification separately.

Some meetings include one or more invitees, and the meeting request for such a meeting typically includes a list of invitees. In some embodiments, handling a meeting request with a list of invitees includes additional steps (814), as described with reference to FIG. 8C.

The server extracts from the request the list of invitees (840). As described with reference to 804, in some embodiments, the request is stored in event database 118. In other embodiments, the request is stored in the front end server 122, or in memory 206 of server 108 or server 112. Server 112 retrieves the request and extracts the list of invitees from the request.

In some embodiments, the server also retrieves from the event database a plurality of preceding events occurring before the meeting (842). Each preceding event includes an event associated with at least one of the invitees and requester. Server 112 retrieves respective preceding events for at least one of the invitees and requester.

For example, when the requested meeting at 3:00 p.m. involves the requester R, and two invitees S and T, server 112 retrieves respective preceding events for the requester R, invitee S, and invitee T. In this example, the requester R has a preceding event starting at 1:00 p.m. and ending at 2:00 p.m., the invitee S's preceding event starting at 11:00 a.m. and ending at 1:00 p.m., and the invitee T's preceding event starting at 1:30 p.m. and ending at 2:45 p.m. Server 112 retrieves R's 1:00 p.m. meeting, S's 11:00 a.m. meeting, and T's 1:30 p.m. meeting from the event database. Server also extracts event location and event end time for respective preceding events. This example is summarized in the following table.

| Attendee | Preceding Event Start time | Preceding Event End time | Preceding Event Location |
|---|---|---|---|
| Requester R | 1:00 p.m. | 2:00 p.m. | ABC |
| Invitee S | 11:00 a.m. | 1:00 p.m. | DEF |
| Invitee T | 1:30 p.m. | 2:45 p.m. | GHI |

In some embodiments, server 112 retrieves preceding events for all the invitees and the requester. As discussed with reference to 806, in some embodiments, retrieving event information for the preceding event includes identifying the preceding event.

In some embodiments, the server determines a respective travel time from an event location associated with each of the preceding events to the meeting location (844). Each respective travel time further corresponds to the event end time of a corresponding event. Various methods for determining the travel time are described above with reference to operation 808 and FIG. 8B, and thus are not repeated here.

In one example, if the meeting location is XYZ, the travel times are as follows.

| Attendee | Preceding Event Starting time | Preceding Event End time | Preceding Event Location | Travel Time to XYZ |
|---|---|---|---|---|
| Requester R | 1:00 p.m. | 2:00 p.m. | ABC | 30 minutes |
| Invitee S | 11:00 a.m. | 1:00 p.m. | DEF | 60 minutes |
| Invitee T | 1:30 p.m. | 2:45 p.m. | GHI | 20 minutes |

In some embodiments, the server identifies a potential travel time scheduling conflict when at least one of the respective travel times exceeds a corresponding time difference between the corresponding event end time and the meeting start time (846).

In the above example, the time difference between the corresponding event end time and the meeting start time is as follows.

| Attendee | Preceding Event Starting time | Preceding Event End time | Travel Time to XYZ | Time Difference Between Event End Time and Meeting Start Time at 3:00 p.m. |
|---|---|---|---|---|
| Requester R | 1:00 p.m. | 2:00 p.m. | 30 minutes | 60 minutes |
| Invitee S | 11:00 a.m. | 1:00 p.m. | 60 minutes | 120 minutes |
| Invitee T | 1:30 p.m. | 2:45 p.m. | 20 minutes | 15 minutes |

In this example, for R's 1:00 p.m. event, the respective travel time (30 minutes) does not exceed the corresponding time difference (60 minutes) between the corresponding event end time and the meeting start time. For S's 11:00 a.m. event, the respective travel time (60 minutes) does not exceed the corresponding time difference (120 minutes) between the corresponding event end time and the meeting start time. For T's 1:30 p.m. event, the respective travel time (20 minutes) exceeds the corresponding time difference (15 minutes) between the corresponding event end time and the meeting start time. Because at least one of the respective travel times (in this example, T's travel time) exceeds the corresponding time difference between the corresponding event end time and the meeting start time, the server identifies a potential travel time scheduling conflict.

In some embodiments, the server provides notification of the potential travel time scheduling conflict to the requester (848). In some embodiments, the notification includes just a fact that there is a potential travel time scheduling conflict (e.g., a flag that indicates a potential travel time scheduling conflict). In other embodiments, the notification includes other information including two or more selected from the group consisting of: the invitee with a potential travel time scheduling conflict, the end time of the event with the potential travel time scheduling conflict, the meeting start time, and the travel time for the invitee with the potential travel time scheduling conflict. Based on the information included in the notification, the requester may decide to schedule the meeting at the requested time despite the potential travel time scheduling conflict, or may decide to schedule the meeting at another time or location.

In some embodiments, server 112 provides notification by transmitting the notification to the client 102 associated with the requester. In other embodiments, the server posts the notification, which can be retrieved by the client 102. In some embodiments, server 112 includes notification as part of calendar display page (e.g., calendar display page 318 as stored in client 102). In other embodiments, server 112 provides notification separately.

Figure 9A:
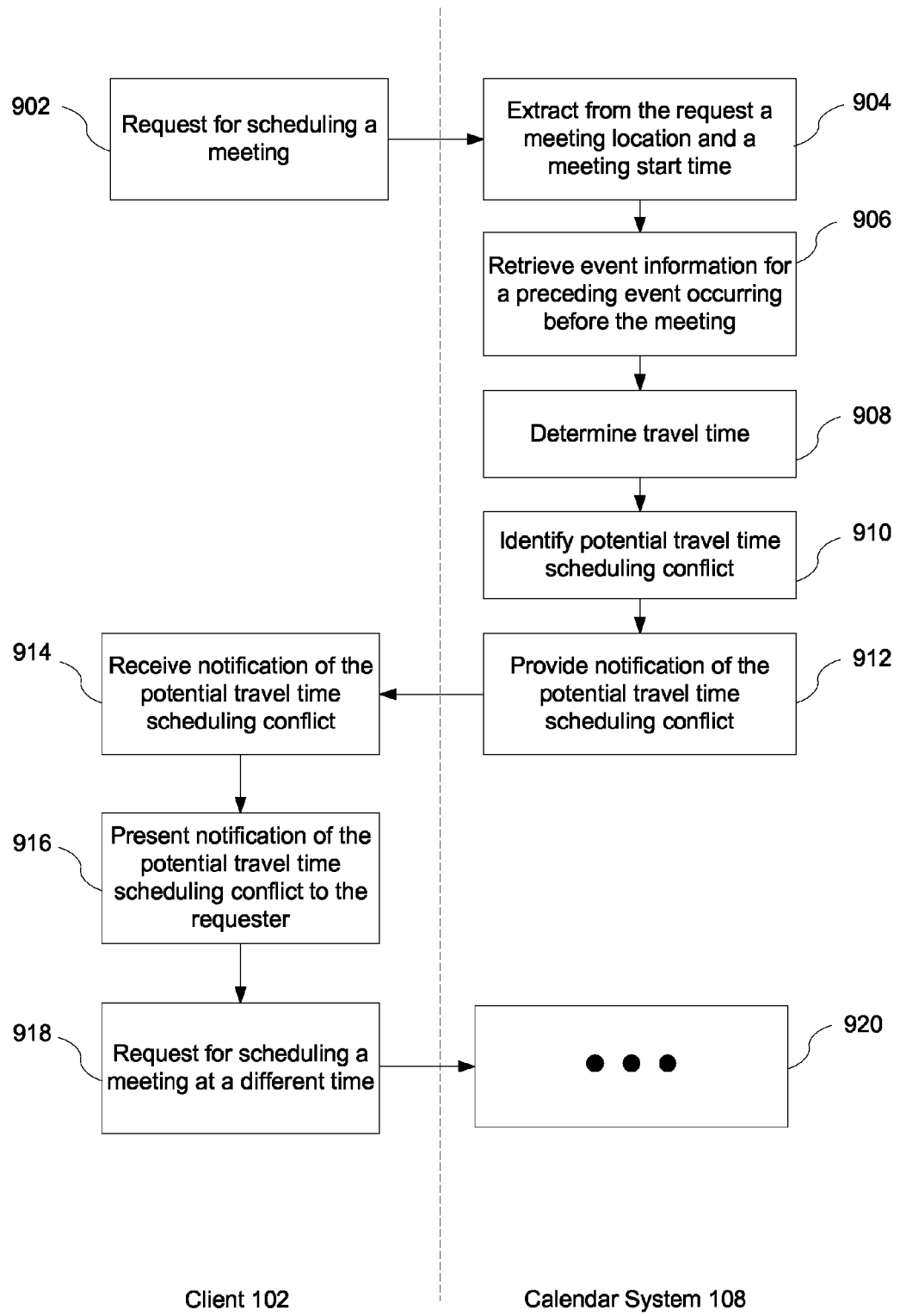
FIGS. 9A-9C are high-level flowcharts illustrating processes performed by client(s) and a server system, for providing notification of potential scheduling conflicts, in accordance with some embodiments.
Figure 9B:
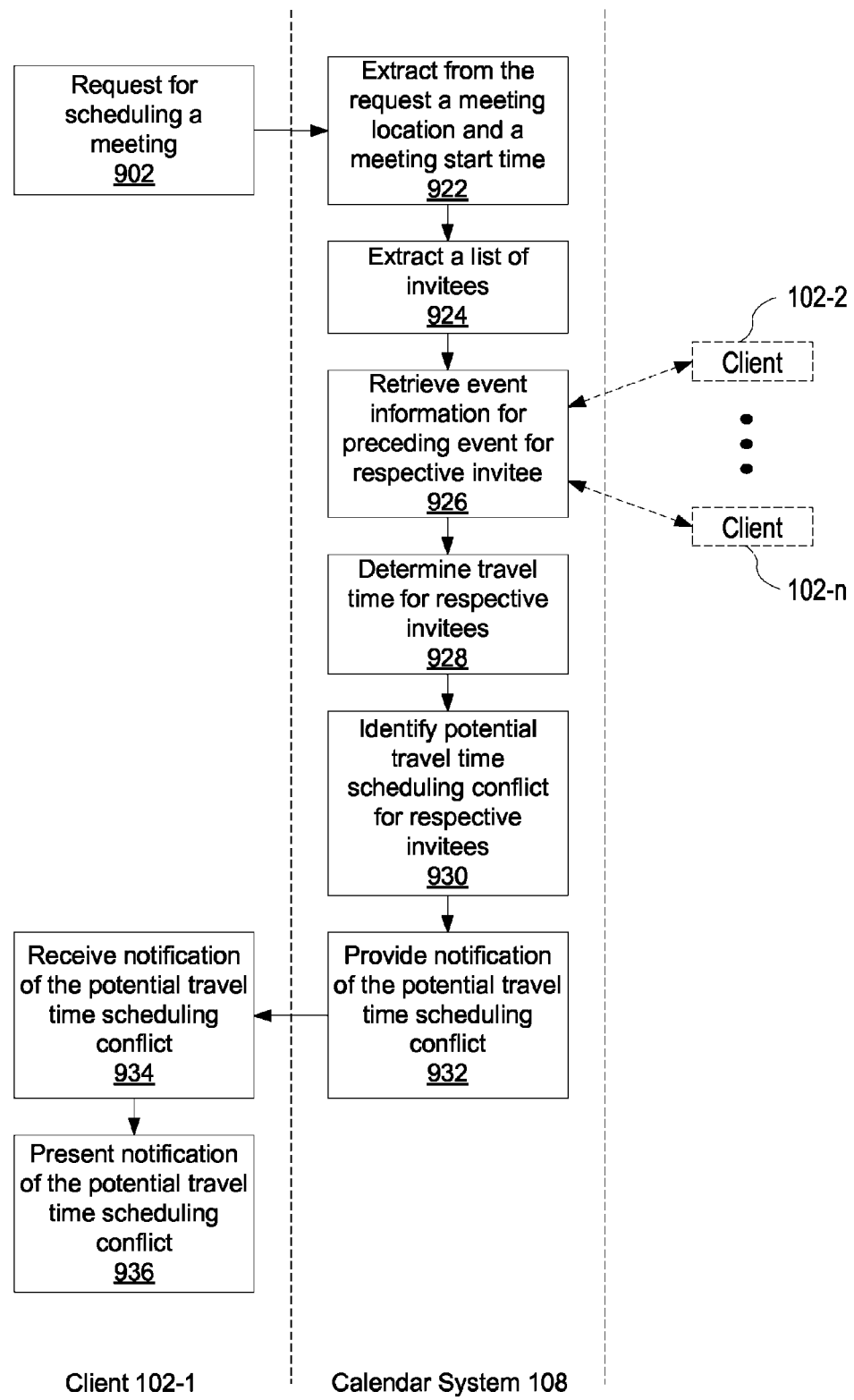
Figure 9C:
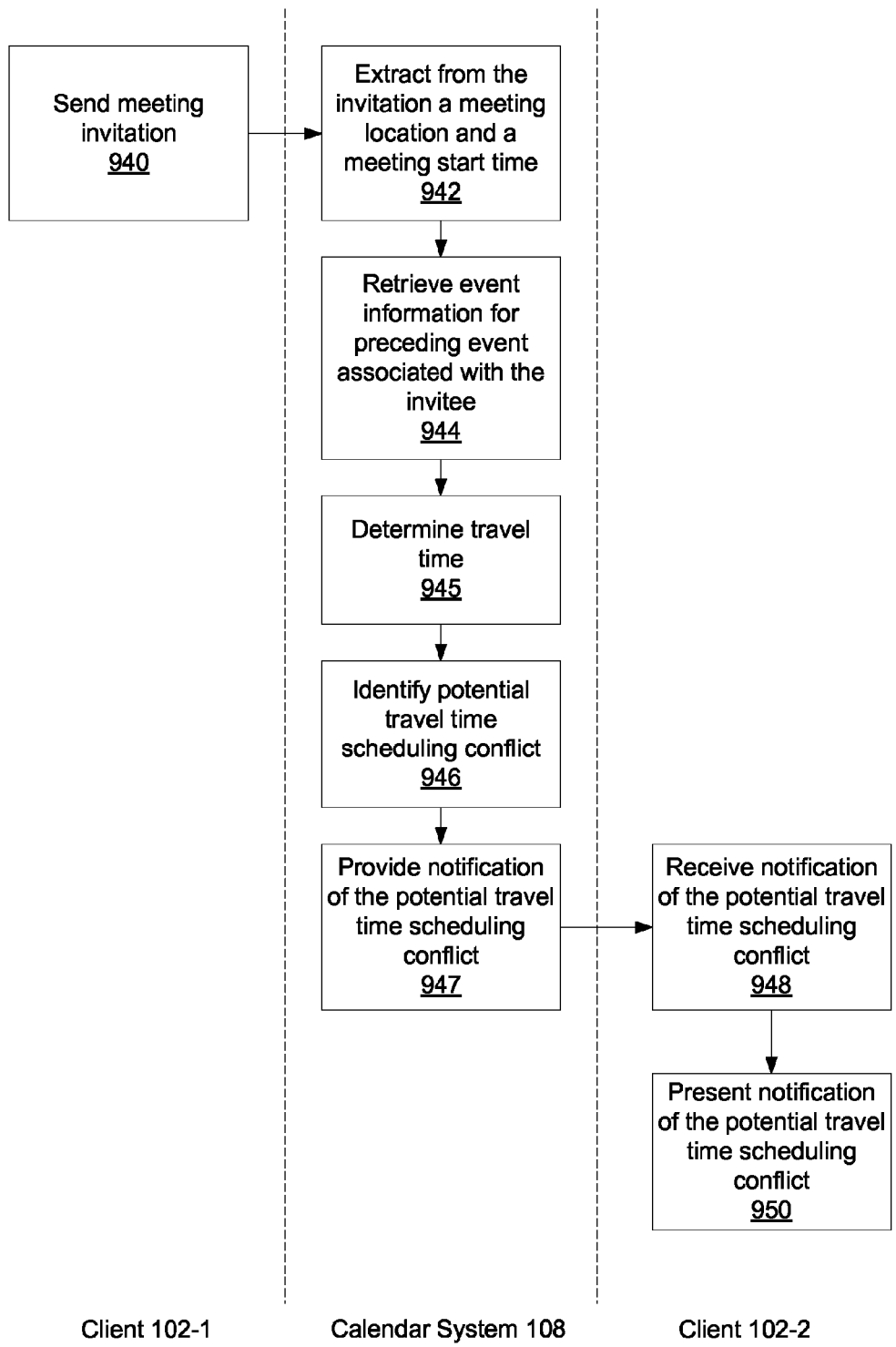

FIGS. 9A-9C are flowcharts illustrating processes performed by client(s) and a server system, in accordance with some embodiments. It will be appreciated by those of ordinary skill in the art that one or more of the acts described may be performed by hardware, software, or a combination thereof, as may be embodied in one or more computing systems. In some embodiments, portions of the process performed by calendar system 108 can be performed by client 102.

In FIG. 9A, client 102 is a computer or other device used by a meeting requester. Client 102 sends a request for scheduling a meeting to a calendar system 108 (902). The calendar system 108 responds by extracting a meeting location and a meeting start time from the request (904), and retrieving event information for a preceding event occurring before the meeting (906). In some embodiments, the calendar system 108 extracts the meeting location and the meeting start time as described above with reference to operation 804. In some embodiments, the calendar system 108 retrieves event information as described above with reference to operation 806.

Based on the meeting location and the event location, calendar system 108 determines travel time from the event location to the meeting location (908). In some embodiments, the calendar system 108 determines the travel time as described above with reference to operation 808.

Based on the travel time and the time difference between the event end time and the meeting start time, calendar system 108 identifies a potential travel time scheduling conflict (910). In some embodiments, the calendar system 108 identifies the potential travel time scheduling conflict as described above with reference to operation 810.

The calendar system 108 provides notification of the potential travel time scheduling conflict (912). In some embodiments, the calendar system 108 provides notification of the potential travel time scheduling conflict as described above with reference to operation 812.

Client 102 receives notification of the potential travel time scheduling conflict (914). In some embodiments, client 102 receives the notification via network interface 304 and networking communication module 312.

Client 102 presents notification of the potential travel time scheduling conflict to the requester (916). In some embodiments, client 102 presents the notification in calendar display page 318. In some embodiments, client 102 presents the notification on GUI 111.

When there is potential travel time scheduling conflict, the requester may decide to schedule (or try to schedule) the meeting at a different time. In that circumstance, client 102 sends a request for scheduling a meeting at a different time (918). In response, calendar system 108 repeats the process described above (904-912).

In FIG. 9B, client 102-1 is a computer or other device used by a meeting requester. Client 102-1 sends a request for scheduling a meeting to a calendar system 108 (902). Calendar system 108 responds by extracting a meeting location and a meeting start time from the request (922). In some embodiments, calendar system 108 extracts the meeting location and the meeting start time as described above with reference to operation 804. In addition, calendar system 108 extracts a list of invitees (924). In some embodiments, calendar system 108 extracts the list of invitees as described above with reference to operation 840.

Server system retrieves event information for preceding events occurring before the meeting for respective invitees (926). In some embodiments, calendar system 108 retrieves event information as described above with reference to operation 842. In other embodiments, when clients 102 store the most current event information, calendar system 108 retrieves event information for preceding events by synchronizing with respective clients (e.g., clients 102-2 through 102-n) associated with the respective invitees, or by retrieving the event information from the respective clients.

Based on the event location associated with each of the preceding events, the meeting location, and the event end time of a corresponding event, calendar system 108 determines travel time from the event location to the meeting location for respective invitees (928). In some embodiments, calendar system 108 determines the travel time as described above with reference to operation 844.

Based on the travel time and the time difference between the event end time and the meeting start time, calendar system 108 identifies a potential travel time scheduling conflict for respective invitees (930). In some embodiments, the calendar system 108 identifies the potential travel time scheduling conflict as described above with reference to operation 846.

The calendar system 108 provides notification of the potential travel time scheduling conflict (932) to client 102-1 (the client used by the requester).

Client 102-1 receives notification of the potential travel time scheduling conflict (934). In some embodiments, client 102-1 receives the notification via network interface 304 and networking communication module 312.

Client 102-1 presents notification of the potential travel time scheduling conflict to the requester (936). In some embodiments, client 102-1 presents the notification in calendar display page 318. In some embodiments, client 102-1 presents the notification on GUI 111.

In some embodiments depicted in FIG. 9C, client 102-1 sends to a calendar system 108 a meeting invitation to an invitee (940). Stated another way, client 102-1 sends a request to calendar system 108 to send a meeting invitation to an invitee. Calendar system 108 responds by extracting a meeting location and a meeting start time from the invitation (942). In some embodiments, calendar system 108 extracts the meeting location and the meeting start time as described with reference to 804 (except that such information is retrieved from the invitation, rather than from the request). Alternately, the request sent by client 102-1 identifies the meeting or event, but does not include the meeting location and meeting start time, in which case that information is retrieved from event database 118 of calendar system 108.

Server system retrieves (from event database 118) event information for preceding events occurring before the meeting for respective invitees, the preceding event comprising a calendar event in a calendar associated with the invitee (944). The event information includes an event location and an event end time. In some embodiments, calendar system 108 retrieves event information as described above with reference to operation 806. In other embodiments, calendar system 108 retrieves event information as described above with reference to operation 842.

Based on the event location and the meeting location, calendar system 108 determines travel time from the event location to the meeting location (945). In some embodiments, calendar system 108 determines the travel time as described above with reference to operation 808.

Based on the travel time and the time difference between the event end time and the meeting start time, calendar system 108 identifies a potential travel time scheduling conflict for the invitee (946). In some embodiments, the calendar system 108 identifies the potential travel time scheduling conflict as described above with reference to operation 810. Stated another way, based on the travel time and the time difference between the event end time and the meeting start time, calendar system 108 determines whether or not there is a potential travel time scheduling conflict, and if the determination is positive, the potential travel time scheduling conflict is identified.

Calendar system 108 provides notification of the potential travel time scheduling conflict (947) to client 102-2 associated with the invitee for whom the potential travel time scheduling conflict has been identified. The invitee notification of the potential travel time scheduling conflict may be accomplished as described above with reference to operation 812 (except that the notification is provided to the invitee, rather than the requester). Optionally, the notification is also provided to the meeting requester.

Client 102-2 receives notification of the potential travel time scheduling conflict (948). For example, client 102-2 may receive the notification via network interface 304 and networking communication module 312.

Client 102-2 presents notification of the potential travel time scheduling conflict to the requester (950). In some embodiments, client 102-2 presents the notification in calendar display page 318, which is typically displayed in GUI 111.

In some embodiments, server 112 includes or implements two or more of the embodiments described herein. In one example, server 112 determines that there is a potential travel time scheduling conflict for the requester as well as one of the invitees, and provides notification of both potential travel time scheduling conflicts to the requester. In another example, server 112 determines that there is a potential travel time scheduling conflict for one of the invitees, and provides notification to both the invitee and the requester. It will be appreciated by those of ordinary skill in the art that other combinations of embodiments descried herein can be implemented.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of providing scheduling assistance, comprising:
   at a system having one or more processors and memory storing one or more programs for execution by the one or more processors:
   in response to a request from a requester for scheduling a meeting:
     extracting from the request a meeting location and a meeting start time;
     retrieving, from an event database, event information for a preceding event occurring before the meeting, including an event location and an event end time;
     determining travel time from the event location to the meeting location;
     identifying a potential travel time scheduling conflict when the travel time exceeds a time difference between the event end time and the meeting start time; and
     providing notification of the potential travel time scheduling conflict to the requester.

2. The method of claim 1, further including:
   in response to the request from the requester for scheduling a meeting:
     extracting from the request a list of invitees, wherein the invitees comprise potential participants other than the requester;
     retrieving from the event database a plurality of preceding events occurring before the meeting, each preceding event comprising an event associated with at least one of the invitees;
     determining a respective travel time from an event location associated with each of the preceding events to the meeting location, each respective travel time corresponding to the event end time of a corresponding event;

identifying a potential travel time scheduling conflict when at least one of the respective travel times exceeds a corresponding time difference between the corresponding event end time and the meeting start time; and providing notification of the potential travel time scheduling conflict to the requester.

3. The method of claim 1, wherein determining the travel time includes determining a pathway from the event location to the meeting location.

4. The method of claim 3, wherein determining the pathway includes calculating a distance from the event location to the meeting location.

5. The method of claim 4, wherein determining the pathway further includes determining a mode of travel based on the distance.

6. The method of claim 3, wherein determining the pathway includes:
   identifying a plurality of candidate pathways from the event location to the meeting location; and
   selecting a pathway from the plurality of candidate pathways based on a predefined criteria.

7. The method of claim 6, wherein the predefined criteria includes a user preference.

8. The method of claim 6, wherein the predefined criteria includes an estimated travel time from the event location to the meeting location for each candidate pathway.

9. The method of claim 3, wherein determining the pathway includes identifying the pathway characteristics.

10. The method of claim 1, wherein determining the travel time includes obtaining a representative travel time from the event location to the meeting location from a map server.

11. The method of claim 1, wherein determining the travel time includes obtaining a representative travel time from the event location to the meeting location from a travel time database.

12. The method of claim 11, including updating the travel time database in accordance with actual travel times of the respective user.

13. A computer system for providing scheduling assistance, comprising:
   one or more processors;
   memory; and
   one or more programs stored in the memory, the one or more programs comprising instructions executed by the one or more processors so as to:
      respond to a request from a requester for scheduling a meeting by:
         extracting from the request a meeting location and a meeting start time;
         retrieving, from an event database, event information for a preceding event occurring before the meeting, including an event location and an event end time;
         determining travel time from the event location to the meeting location; identifying a potential travel time scheduling conflict when the travel time exceeds a time difference between the event end time and the meeting start time; and
         providing notification of the potential travel time scheduling conflict to the requester.

14. The computer system of claim 13, wherein the one or more programs further include instructions for:
   in response to the request from the requester for scheduling a meeting:
      extracting from the request a list of invitees, wherein the invitees comprise potential participants other than the requester;
      retrieving from the event database a plurality of preceding events occurring before the meeting, each preceding event comprising an event associated with at least one of the invitees;
      determining a respective travel time from an event location associated with each of the preceding events to the meeting location, each respective travel time corresponding to the event end time of a corresponding event;
      identifying a potential travel time scheduling conflict when at least one of the respective travel times exceeds a corresponding time difference between the corresponding event end time and the meeting start time; and
      providing notification of the potential travel time scheduling conflict to the requester.

15. A non-transitory computer readable storage medium storing one or more programs configured for execution by one or more processors of a computer for providing scheduling assistance, the one or more programs comprising instructions to be executed by the one or more processors so as to:
   respond to a request from a requester for scheduling a meeting by:
      extracting from the request a meeting location and a meeting start time;
      retrieving, from an event database, event information for a preceding event occurring before the meeting, including an event location and an event end time;
      determining travel time from the event location to the meeting location;
      identifying a potential travel time scheduling conflict when the travel time exceeds a time difference between the event end time and the meeting start time; and
      providing notification of the potential travel time scheduling conflict to the requester.

16. The computer readable storage medium of claim 15, wherein the one or more programs further include instructions for:
   in response to the request from the requester for scheduling a meeting:
      extracting from the request a list of invitees, wherein the invitees comprise potential participants other than the requester;
      retrieving from the event database a plurality of preceding events occurring before the meeting, each preceding event comprising an event associated with at least one of the invitees;
      determining a respective travel time from an event location associated with each of the preceding events to the meeting location, each respective travel time corresponding to the event end time of a corresponding event;
      identifying a potential travel time scheduling conflict when at least one of the respective travel times exceeds a corresponding time difference between the corresponding event end time and the meeting start time; and
      providing notification of the potential travel time scheduling conflict to the requester.

17. A computer-implemented method of providing scheduling assistance, comprising:
   at a system having one or more processors and memory storing one or more programs for execution by the one or more processors:
      in response to a meeting invitation to an invitee from a requester,
         extracting from the meeting invitation a meeting location and a meeting start time;

retrieving, from an event database, event information for a preceding event occurring before the meeting, including an event location and an event end time, the preceding event comprising a calendar event in a calendar associated with the invitee;

determining travel time from the event location to the meeting location;

identifying a potential travel time scheduling conflict when the travel time exceeds a time difference between the event end time and the meeting start time; and providing notification of the potential travel time scheduling conflict to the invitee.

18. The method of claim 17, wherein determining the travel time includes determining a pathway from the event location to the meeting location.

19. A computer system for providing scheduling assistance, comprising:

one or more processors;

memory; and one or more programs stored in the memory, the one or more programs comprising instructions executed by the one or more processors so as to:

respond to a meeting invitation to an invitee from a requester by:

extracting from the meeting invitation a meeting location and a meeting start time;

retrieving, from an event database, event information for a preceding event occurring before the meeting, including an event location and an event end time, the preceding event comprising a calendar event in a calendar associated with the invitee;

determining travel time from the event location to the meeting location;

identifying a potential travel time scheduling conflict when the travel time exceeds a time difference between the event end time and the meeting start time; and providing notification of the potential travel time scheduling conflict to the invitee.

20. The computer system of claim 19, wherein the one or more programs include instructions for determining a pathway from the event location to the meeting location.

21. A non-transitory computer readable storage medium storing one or more programs configured for execution by one or more processors of a computer for providing scheduling assistance, the one or more programs comprising instructions to be executed by the one or more processors so as to:

respond to a meeting invitation to an invitee from a requester by:

extracting from the meeting invitation a meeting location and a meeting start time;

retrieving, from an event database, event information for a preceding event occurring before the meeting, including an event location and an event end time, the preceding event comprising a calendar event in a calendar associated with the invitee;

determining travel time from the event location to the meeting location;

identifying a potential travel time scheduling conflict when the travel time exceeds a time difference between the event end time and the meeting start time; and providing notification of the potential travel time scheduling conflict to the invitee.

22. The computer readable storage medium of claim 21, wherein the one or more programs include instructions for determining a pathway from the event location to the meeting location.

* * * * *